US008131722B2

(12) United States Patent
Sundaresan et al.

(10) Patent No.: US 8,131,722 B2
(45) Date of Patent: Mar. 6, 2012

(54) SEARCH CLUSTERING

(75) Inventors: Neelakantan Sundaresan, Mountain View, CA (US); Kavita Ganesan, San Jose, CA (US); Roopnath Grandhi, Sunnyvale, CA (US)

(73) Assignee: eBay Inc., San Jose, CA (US)

( * ) Notice: Subject to any disclaimer, the term of this patent is extended or adjusted under 35 U.S.C. 154(b) by 494 days.

(21) Appl. No.: 11/771,464

(22) Filed: Jun. 29, 2007

(65) Prior Publication Data
US 2008/0120292 A1    May 22, 2008

Related U.S. Application Data

(60) Provisional application No. 60/866,598, filed on Nov. 20, 2006, provisional application No. 60/904,295, filed on Feb. 28, 2007.

(51) Int. Cl.
*G06F 7/00* (2006.01)
*G06F 17/30* (2006.01)

(52) U.S. Cl. ............... 707/737; 707/736; 707/E17.089

(58) Field of Classification Search .............. 707/3–5, 707/708, 736, 737, E17.089, 999.003
See application file for complete search history.

(56) References Cited

U.S. PATENT DOCUMENTS

| | | | | |
|---|---|---|---|---|
| 5,924,105 A * | 7/1999 | Punch et al. | ............... | 715/234 |
| 5,974,396 A * | 10/1999 | Anderson et al. | ............... | 705/7.33 |
| 6,308,149 B1 * | 10/2001 | Gaussier et al. | ............... | 704/9 |
| 6,401,088 B1 * | 6/2002 | Jagadish et al. | ............... | 707/719 |
| 6,556,983 B1 * | 4/2003 | Altschuler et al. | ............... | 706/55 |
| 6,578,032 B1 * | 6/2003 | Chandrasekar et al. | ............... | 1/1 |
| 6,928,404 B1 * | 8/2005 | Gopalakrishnan et al. | ...... | 704/10 |
| 6,981,040 B1 * | 12/2005 | Konig et al. | ............... | 709/224 |
| 7,035,855 B1 * | 4/2006 | Kilger et al. | ............... | 707/703 |
| 7,185,001 B1 * | 2/2007 | Burdick et al. | ............... | 707/3 |
| 7,295,995 B1 * | 11/2007 | York et al. | ............... | 705/26.8 |
| 7,330,849 B2 * | 2/2008 | Gerasoulis et al. | ............... | 707/3 |
| 7,349,899 B2 * | 3/2008 | Namba | ............... | 707/6 |
| 7,472,102 B1 * | 12/2008 | Heckerman et al. | ............... | 706/47 |
| 7,519,605 B2 * | 4/2009 | Vailaya et al. | ............... | 707/100 |
| 7,617,176 B2 * | 11/2009 | Zeng et al. | ............... | 707/1 |
| 7,720,846 B1 * | 5/2010 | Bayliss | ............... | 707/736 |
| 7,743,059 B2 * | 6/2010 | Chan et al. | ............... | 707/737 |
| 7,801,896 B2 * | 9/2010 | Szabo | ............... | 707/739 |
| 7,921,099 B2 * | 4/2011 | Bierner | ............... | 707/708 |
| 2002/0078044 A1 * | 6/2002 | Song et al. | ............... | 707/6 |
| 2002/0174119 A1 * | 11/2002 | Kummamuru et al. | ............... | 707/6 |
| 2003/0037041 A1 * | 2/2003 | Hertz | ............... | 707/1 |
| 2004/0093321 A1 * | 5/2004 | Roustant et al. | ............... | 707/3 |
| 2006/0026152 A1 * | 2/2006 | Zeng et al. | ............... | 707/5 |
| 2006/0178946 A1 * | 8/2006 | Agarwal | ............... | 705/26 |
| 2006/0206306 A1 * | 9/2006 | Cao et al. | ............... | 704/4 |
| 2006/0293995 A1 * | 12/2006 | Borgs et al. | ............... | 705/37 |

(Continued)

*Primary Examiner* — Kuen Lu
*Assistant Examiner* — Jessica N Le
(74) *Attorney, Agent, or Firm* — Schwegman, Lundberg & Woessner, P.A.

(57) ABSTRACT

In one example embodiment, a method is illustrated as including retrieving item data from a plurality of listings, the item data filtered from noise data, constructing at least one base cluster having at least one document with common item data stored in a suffix ordering, compacting the at least one base cluster to create a compacted cluster representation having a reduced duplicate suffix ordering amongst the clusters, and merging the compact cluster representation to generate a merged cluster, the merging based upon a first overlap value applied to the at least one document with common item data.

23 Claims, 14 Drawing Sheets

U.S. PATENT DOCUMENTS

| | | |
|---|---|---|
| 2007/0143266 A1* | 6/2007 | Tang et al. .......... 707/3 |
| 2007/0174269 A1* | 7/2007 | Jing et al. .......... 707/5 |
| 2008/0065630 A1* | 3/2008 | Luo et al. .......... 707/6 |
| 2008/0097959 A1* | 4/2008 | Chen et al. .......... 707/2 |
| 2008/0104542 A1* | 5/2008 | Cohen et al. .......... 715/810 |
| 2008/0195595 A1* | 8/2008 | Masuyama et al. .......... 707/5 |
| 2008/0222145 A1* | 9/2008 | Liu et al. .......... 707/5 |
| 2009/0089272 A1* | 4/2009 | Oliver et al. .......... 707/5 |
| 2009/0182625 A1* | 7/2009 | Kilger et al. .......... 705/10 |

* cited by examiner

SEARCH CLUSTERING

CROSS REFERENCE TO RELATED APPLICATIONS

This is a non-provisional patent application claiming priority under 35 USC §119(e) to U.S. Provisional Patent Application No. 60/866,598 entitled "A MULTI-FACTOR CLUSTERING SYSTEM FOR A MARKETPLACE SEARCH INTERFACE" that was filed on Nov. 20, 2006, and U.S. Provisional Patent Application No. 60/904,295 filed on Feb. 28, 2007 entitled "MULTI-FACTOR CLUSTERING FOR A SEARCH INTERFACE," both of which are incorporated by reference in their entirety.

TECHNICAL FIELD

The present application relates generally to the technical field of search algorithms and, in one specific example, the generation of a searchable data structure.

BACKGROUND

In many cases, the success of a search algorithm is tied to the data structure that is being searched, and more specifically the organization of this data structure. Certain ways of organizing a data structure, and the data contained therein, may result in large savings in terms of time needed to search and produce search results. Further, certain data structures may result in more accurate search results being produced for a given query.

BRIEF DESCRIPTION OF THE DRAWINGS

Some embodiments are illustrated by way of example and not limitation in the figures of the accompanying drawings in which.

DETAILED DESCRIPTION

Example methods and systems to facilitate video mail in a peer to peer network are illustrated. In the following description, for purposes of explanation, numerous specific details are set forth in order to provide a thorough understanding of example embodiments. It will be evident, however, to one skilled in the art that the present invention may be practiced without these specific details.

In some embodiments, a system and method is disclosed for building a searchable data structure wherein each node in the data structure contains clusters of data. These clusters are generated based upon a variety of factors, including, for example, relevancy weighting, seller factors, price factors, category factors, image factors, and other suitable factors. In one embodiment, this data structure (e.g., a merged cluster map) is generated from a trie or some other data structure that has constant time (O(1)) search performance, or near constant time search performance (e.g., amortized O(1)). These other data structures may include hash tables, binary search trees, red-black trees, heaps, or other suitable data structure. In one embodiment, a Suffix Tree Clustering (STC) algorithm is implemented.

Example embodiments may include an implementation of an STC algorithm building a suffix trie using the terms in documents that are to be divided into groups of clusters based upon the commonality of phrases in the documents. In some embodiments, there are 3 steps to implementing STC—1. Document preparation; 2. Identifying base clusters; and 3. Merging clusters. During the merging of clusters, various relevance weighing factors (e.g., multi-factor clustering) may be utilized to merge the clusters in more or less desirable ways depending upon the selected factors.

A System for Implementing STC

Figure 1:
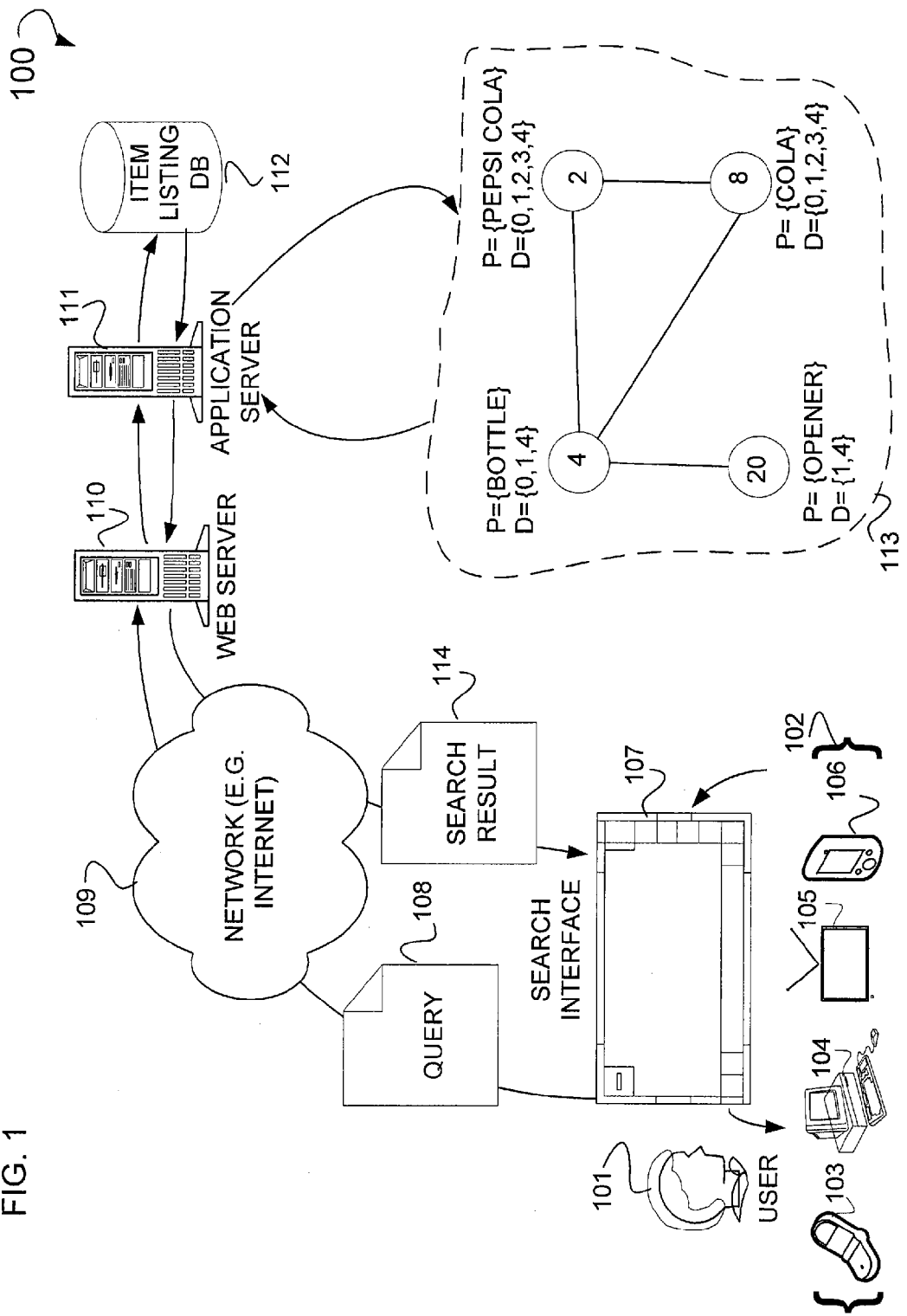
FIG. 1 is a diagram of a system for using search clustering, according to an example embodiment.

FIG. 1 is a diagram of an example system 100 illustrating a system for using search clustering. Shown is a user 101 utilizing a search interface 107 that resides on any one of a number of devices 102. These devices 102 may include, for example, a cell phone 103, a computer system 104, a television 105, and/or a Personal Digital Assistant (PDA) 106. This user 101 may generate a query 108. This query 108 may be, for example, a search query generated for the purposes of searching some type of web accessible database. In one embodiment, the query 108 is sent across a network 109 to a web server 110. Once received by the web server 110, the query 108 is parsed and provided to an application server 111. Using parsed data (e.g., the search terms) from the query 108, the application server 111 may then, for example, build a merged cluster map 113 using data stored in an item listing database 112. The application server 111 may be operatively coupled to this item listing database 112. This merged cluster map may be built using a number of the below illustrated operations, and may be built through the use of an STC algorithm. Using this merged cluster map 113, a search result 114 may be generated and provided to the user 101 via the search interface 107.

In some embodiments, the query 108 may be sent to more than one web server 110. Further, this web server 110 may be connected to more than just the application server 111 and may in fact be connected to a plurality of application servers. Additionally, this application server 110 may be connected to a plurality of item listing databases in addition to item listing database 112. Further, though not depicted, this application server 111 and/or a plurality of application servers may be operatively coupled to any one of a number of database servers that may serve as an intermediary between the application server 111 and databases such as the item listing database 112.

In some embodiments, for a given query (e.g., a search query), the system may obtain search result 114 for that particular query. This may be achieved through an API call made to a search back end. Subsequently, a HTTP based method call is made to obtain relevance weighting for that particular query from a Relevance-Weighting System. In some embodiments, different queries return relevance weightings specific to that query. Next, the search results obtained are then clustered on the fly using the standard STC algorithm with influencing factors like the relevance-weighting factor, pre-defined merge threshold and pre-defined base cluster score. The clustered results are then sent to the labeling algorithm. The labeling algorithm uses some statistical measure to provide descriptive tags that represent the clusters on the whole, such that the clusters have meaning for the person performing the search.

Figure 2:
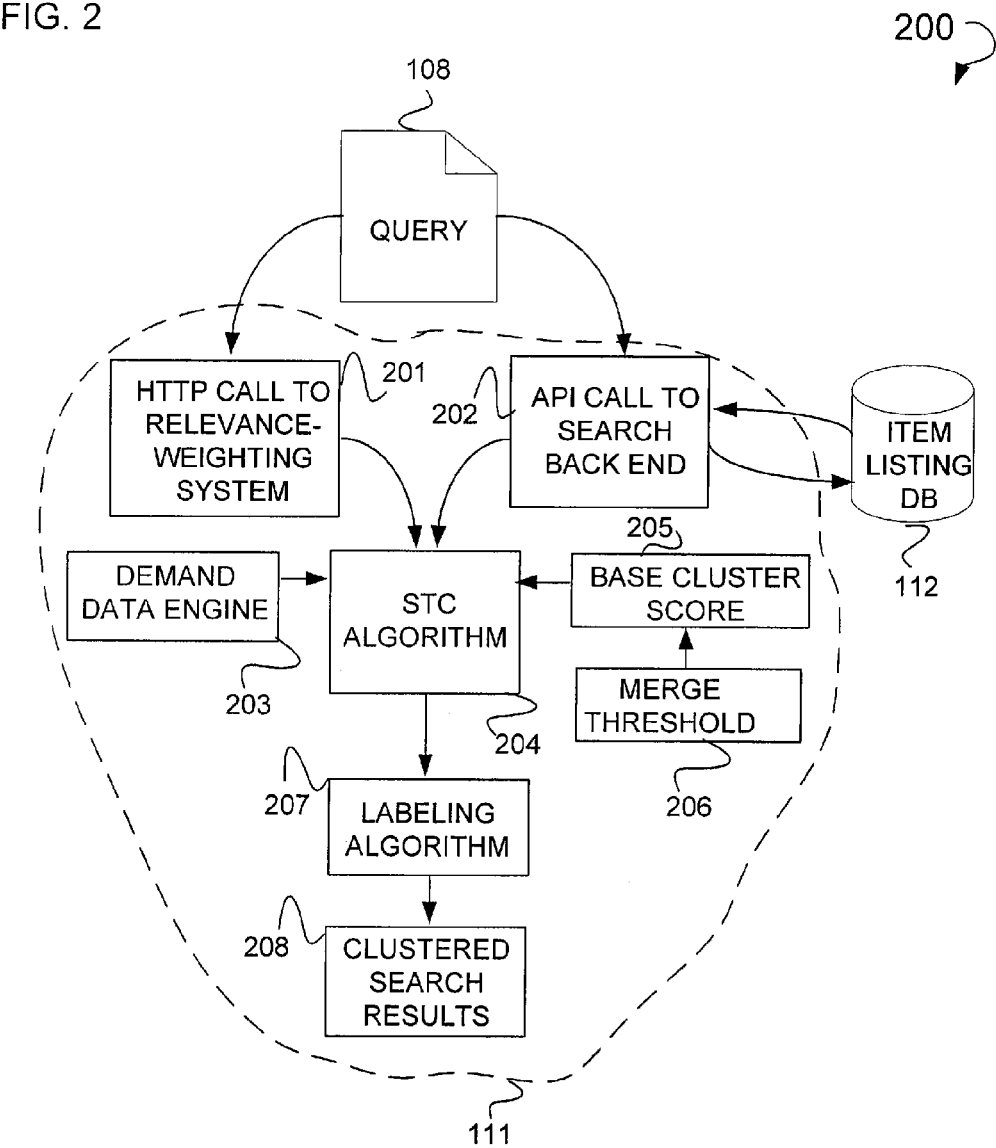
FIG. 2 is a flowchart illustrating a method used to implement a system for search clustering, according to an example embodiment.

FIG. 2 is a flowchart illustrating an example method 200 showing the operational flow of the previously illustrated clustering system. Shown is a query 108 that is received by, for example, the application server 111. Once received, an operation 201 is executed that sends an HTTP call to a relevancy weighting system. This relevancy weighting system, and, more specifically, this operation 201, is more fully illustrated below. Additionally, this query 108 is also sent to an operation 202 which, when executed, makes an API based call to a search back end, such as the previously illustrated item listing database 112. Once operations 201 and 202 are executed, a further operation 204 is executed wherein an STC algorithm is executed via an execution of operation 204. Prior to the execution of the operation 204, a number of additional operations may be executed. For example, an operation 203 may be executed wherein a demand data engine is executed and returns demand data to the operation 204. Further, operations 206 and 205 are executed wherein operation 206 provides merged threshold data to the operation 205. The operation 205 computes a base cluster score using the merged threshold data received from the operation 206, and provides this base cluster score to the operation 204. Once operation 204 successfully completes its execution, a further operation 207 is executed that labels the various clusters generated through the execution of the operation 204. Then, in some cases, an operation 208 is executed that, in effect, clusters the search results. These various operations (e.g., 201-208) may reside on the previously illustrated application server 111. Additional details with regard to each one of these operations will be more fully illustrated below.

Document Preparation

In some embodiments, text in the form of strings are processed, wherein these strings are capable of reversible mapping to other strings. These strings may appear in documents such as web pages, or other types of electronically generated documents. Strings in the form of advertisements appearing on web pages advertising the sale of goods or services may be one example of a document. These advertisements may contain titles, seller information, and other descriptive string based information.

Example embodiments may include the populating of an item listing database 112 for the purpose of providing data upon which to conduct a search. In some embodiments, a rule set (e.g., an eXtensible Markup Language (XML) based file) is provided to an parsing operation, wherein the rule set outlines a grammar based upon which parsing may occur. This parsing operation may, in some embodiments, remove (e.g., filter) noise words from an electronic document in the form of, for example, an advertisement. These noise words may be duplicate words in the electronic document, or words that otherwise do not add meaning to the electronic document. After the completion of the parsing operation, the remaining words are stored into a data structure residing on, for example, the item listing database 112. These remaining words (e.g., item listings) may be organized by price of the item to which they refer, date and time the advertisement was created, or organized based upon other properties to be used in the selecting of item listing for the purpose of satisfying a query such as query 108.

In some embodiments, a mapping in the form of, for example, a bayesian network, decision tree, or other suitable data structure is generated wherein all the words in a document (e.g., both noise words and the keywords) are placed into a data structure as nodes with weighted links connecting the nodes. These weighted links may represent probability values for determining whether a word or combination of words appearing in a item listing are noise or key words.

Some embodiments may include the populating of an item listing database 112 for the purpose of providing data upon which to conduct a search. In some embodiments, demand data and attribute data are used to determine which words are noise and which are not during the course of populating an item listing database 112. Titles, as entered by users, have high degree of variability. For example, for any single phrase/item we can have a large number of variations in occurrence location in the title along with the combination of noise words like adjectives and prepositions. Example embodiments may include the use of demand data and attribute data to find the important/relevant words in the item listings. This demand data may be data relating to how often a word has been used by all users, or a portion of users conducting a search. Attribute data may be data that defines some other piece of data such that the attribute is dependant upon this other piece of data. In one embodiment, a set of relevant words for a query q is built through the following steps:

- Gather the demand data for the query q, both the contained and related queries of q;
- Gather the attribute data for all the search results of query q;
- Remove from the set of collected words common noise words like "Sealed", "amazing";
- Remove from the set of collected words, all the words in q and its singular/plural combinations.

By building this set of relevant words, the search process is benefited, as the relevancy of clusters/cluster tags may be enhanced, and the recall/retrieval process is benefited as noise words are eliminated, improving recall. This process of using demand factors to eliminate noise words may be applied during population of a data base containing searchable data (e.g., an item listing database 112 containing string data), or may be used at a later point (e.g., after a search has been conducted and results retrieved).

Identifying Base Clusters

In some embodiments, item listing data may be retrieved via the execution of the operation 202 from the item listing database 112 for the purpose of identifying and building a trie of possible search results based upon a particular search query, such as query 108. Further, this query 108 may be classified through the execution of an operation 201 prior to the building of the trie. This trie may be a suffix trie, or even a prefix trie. Further, as discussed above, other types of data structures may be used in lieu of a trie for the purpose of organizing item listing data for searching. Once built, the trie may be compacted so as to generate clusters of electronic documents (e.g., base clusters), wherein the clustering is based upon strings and similarities or even differences in strings. This clustering may be performed using various types of logical operations such as intersection (∩) so as to eliminate duplicate strings contained in two or more clustered electronic documents. Other operations may include joins (e.g., inter join, outer join), difference (−), and other operations common to query languages such as a Structured Query Language (SQL) and the Multidimensional Expressions (MDX) language.

Figure 3:
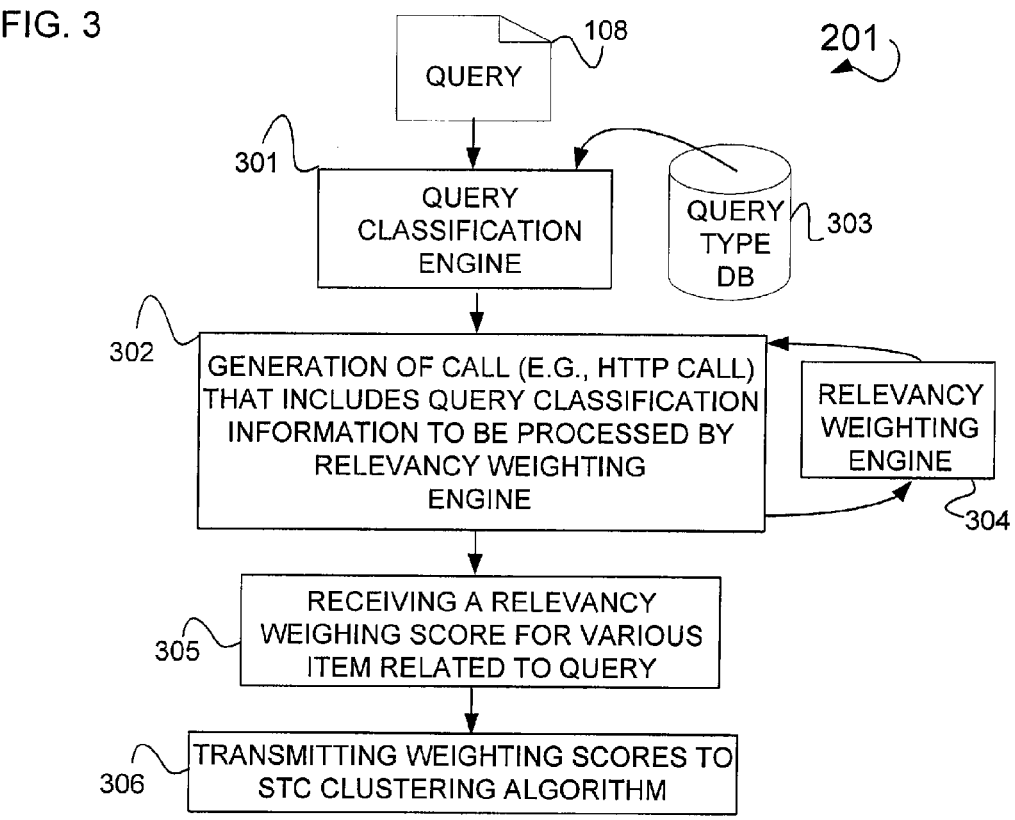
FIG. 3 is a flowchart illustrating a method used to execute an operation that sends a Hyper Text Transfer Protocol (HTTP) call to a relevancy weighting system, according to an example embodiment.

FIG. 3 is a flowchart illustrating an example method used to execute operation 201. Illustrated is a query 108 that is provided to an operation 301. In cases where this operation 301 is executed, this query 108 is classified through the retrieval of a query type from a query type database 303. In some embodiments, the retrieval of this query type data from the query type database 303 may be performed using, for example, SQL, or some other suitable database query language. Upon the completion and the execution of operation 301, an operation 302 is executed. Through the execution of this operation 302, an HTTP call is generated that includes the query classification information taken or received from the operation 301. This query classification information is then provided to an operation 304 that functions as a relevancy weighting engine, wherein once the query classification information is received by the relevancy weighting engine 304, a relevancy weighting score or value is generated and returned by the operation 304 to the operation 302. Operation 302 then provides this relevancy weighting score to an operation 305. In some embodiments, this operation 305 acts to receive the relevancy weighting score for various items related to the query 108. Once received, an operation 306 is executed that transmits the relevancy weighting scores to the STC algorithm as reflected in operation 204.

Figure 4:
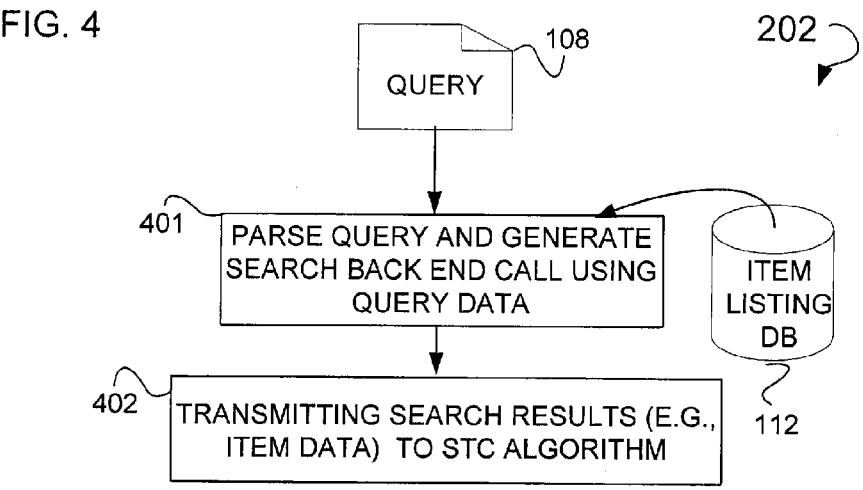
FIG. 4 is a flowchart illustrating a method used to execute an operation that makes an Application Programming Interface (API) call to a search backend call, according to an example embodiment.

FIG. 4 is a flowchart illustrating an example method used to execute operation 202. Shown is a query 108 that is provided and/or retrieved by an operation 401. This operation 401 acts to parse the query 108 and generates a search back end call using the query data that is parsed from the query 108. In some embodiments, this search back end call may be, for example, the previously illustrated SQL call, or some other suitable database language call. This call is provided to an item listing database 112. Once operation 401 is executed, and the call made to the item listing database 112, a further operation 402 is executed. This operation 402 transmits the search results as a form of item data to the previously illustrated STC algorithm, as embodied in operation 204. This item data may be, for example, data existing as part of a document such as an advertisement for an item for sale (e.g., a sale item listing), or some other suitable data relating to the sale of a good or service. In some embodiments, the operation 401 interfaces with the item listing database 112 via an API such as Open Database Connectivity (ODBC), Java Database Connectivity (JDBC), or some other type of database API.

Some embodiments may include the various databases (e.g., 112) being relational databases, or, in some cases, On-Line Analytical Processing (OLAP) based databases. In the case of relational databases, various tables of data (e.g., item data, or data that is related to or part of the electronic document) are created and data is inserted into and/or selected from these tables using an SQL or some other database-query language known in the art. In the case of OLAP databases, one or more multi-dimensional cubes or hyper cubes, containing multidimensional data from which data is selected from or inserted into using an MDX may be implemented. In the case of a database using tables and SQL, a database application such as, for example, MYSQL™, MICROSOFT SQL SERVER™, ORACLE 8I™, 10G™, or some other suitable database application may be used to manage the data. In this, the case of a database using cubes and MDX, a database using Multidimensional On Line Analytic Processing (MOLAP), Relational On Line Analytic Processing (ROLAP), Hybrid Online Analytic Processing (HOLAP), or some other suitable database application may be used to manage the data. The tables or cubes made up of tables, in the case of, for example, ROLAP, are organized into an RDS or Object Relational Data Schema (ORDS), as is known in the art. These schemas may be normalized using certain normalization algorithms so as to avoid abnormalities such as non-additive joins and other problems. Additionally, these normalization algorithms may include Boyce-Codd Normal Form or some other normalization or optimization algorithm known in the art.

Building an Example Data Structure

In some embodiments, once the item data is retrieved by the operation 202 and the classification of the query 108 is determined, an uncompacted trie is built. Consider, for example, the following five item titles retrieved in response to the search query "Pepsi Cola": "Pepsi Cola Bottle Cap," "Pepsi Cola Bottle Opener," "Old Pepsi Cola Lighter," "Pepsi Cola Coin Bank," "Vintage Pepsi Cola Bottle Opener." Using these five retrieved titles, an uncompacted trie may be built.

Figure 5:
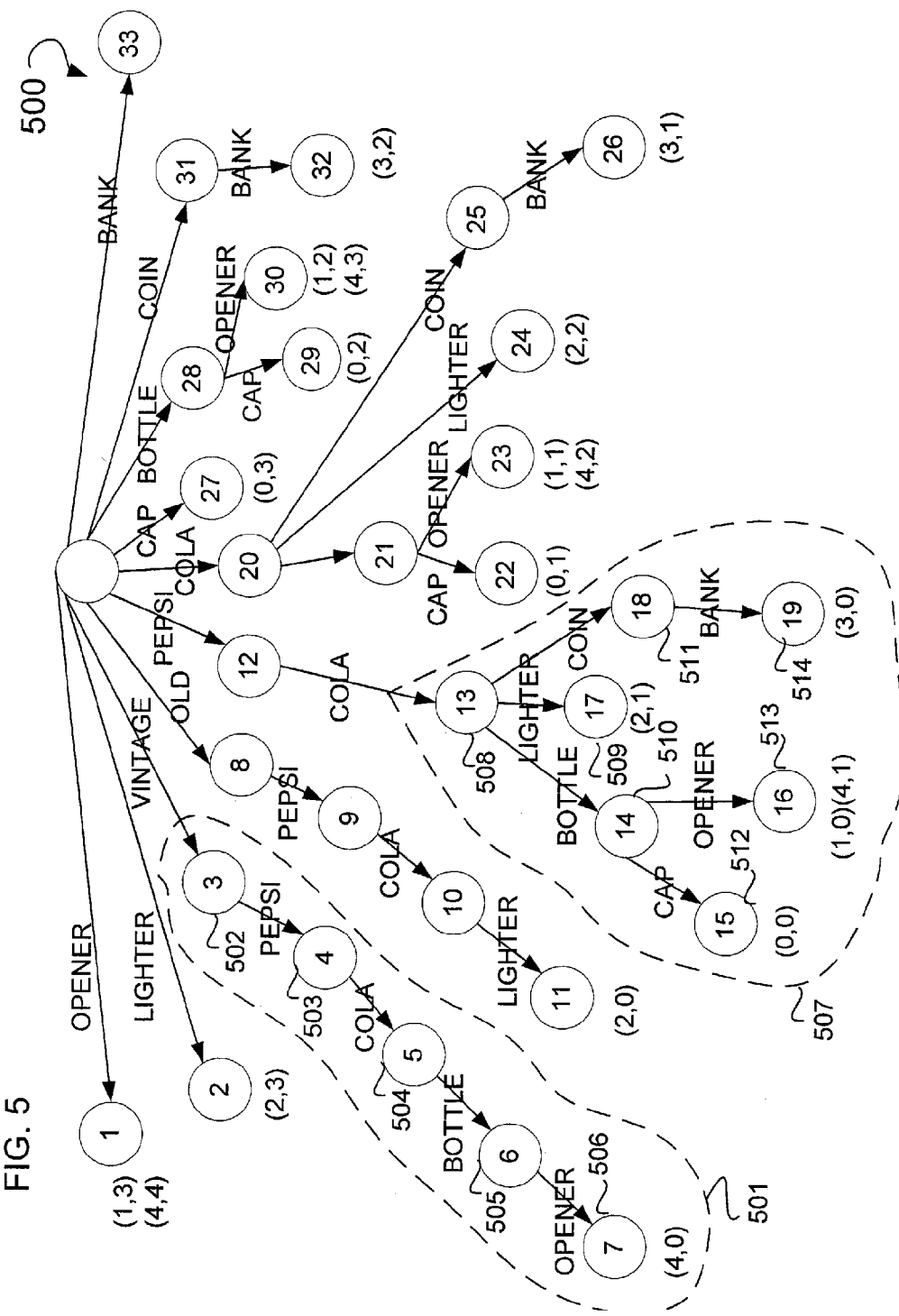
FIG. 5 is a diagram illustrating an uncompacted tree that may be generated through the execution of a suffix tree clustering algorithm, according to an example embodiment.

FIG. 5 is a diagram of an uncompacted tree 500 that may be generated through the execution of, for example, an STC algorithm, such as the one utilized in operation 204. With regard to the properties of this uncompacted tree, in some embodiments, each edge between each node of the tree may represent a substring of a larger string "S." Further, each leaf node contains data relating to common documents containing common item data (e.g., substrings of the string "S"). For example, subtree 501 contains nodes 3 through 7 wherein, for example, node 3 labeled herein as 502, is linked to a node 4 labeled 503 through the edge labeled "Pepsi." Further, this node 4, labeled herein as 503, is linked to a node 5 labeled as 504 via an edge labeled "Cola." Additionally, this node 5, labeled here as 504, may be linked to a node 6 labeled as 505 via an edge labeled as "Bottle." Moreover, this node 6, labeled here as 50, may be linked to a node 7 labeled herein as 506 via an edge titled "Opener." Collectively, these various nodes (e.g., 502-506) represent the substring "Pepsi Cola Bottle Opener." The leaf node (e.g., 506) also contains a reference to the set of documents containing item data that contain the substring "Pepsi Cola Bottle Opener." Specifically, documents 4 and 0 contain this substring.

In addition to the subtree 501, further subtrees are illustrated in this uncompacted tree 500. For example, a subtree 507 contains a variety of nodes 508-514. More to the point, a node 13, referenced as 508, is connected to a node 14, referenced as 510, via an edge labeled "Bottle." Further, the node 14 labeled as 510 is connected to a node 15 labeled as 512 via an edge labeled "Cap." Moreover, this node 14 labeled as 510 is connected additionally to a node 16 labeled as 513 via an edge labeled "Opener." Further, the node 13 labeled as 508 is connected to a node 17 labeled as 509 by an edge labeled "Lighter." This node 13 labeled as 508 is also connected to a node 18 labeled as 511 via an edge labeled "Coin." The node 18 labeled as 511 is further connected to a node 19 labeled as 514 via an edge labeled as "Bank." This subtree 507 is in turn connected to a further node 12 by an edge labeled "Cola." This node 12 is in turn connected to another root node by an edge labeled "Pepsi." Traversing through the subtree 507 and utilizing the node 12 and root node, the following substrings may be generated. For example, the substring "Pepsi Cola Bottle Cap" may be generated, wherein the leaf node at the end of this path (e.g., node 15 labeled as 512) denotes that document 0 contains this substring. Again, traversing through this subtree 507 and the connected node 12 and root node, the further substring of "Pepsi Cola Lighter" may be generated wherein this substring is contained in documents 2 and 1 as referenced by node 17 (e.g., 509). A further substring may be generated in the form of "Pepsi Cola Bottle Opener," wherein this substring is contained in documents 0, 1 and 4 (see e.g., node 16 referenced herein as 513). An additional substring contains the terms "Pepsi Cola Coin Bank," wherein this substring is contained in documents 0 and 3 (see e.g., node 19 referenced herein as 514).

Figure 6:
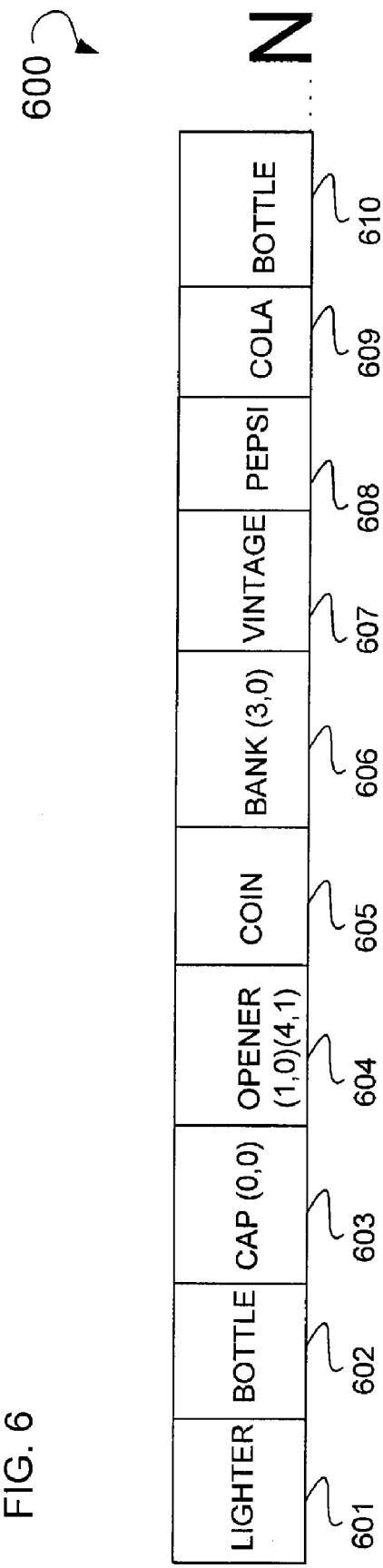
FIG. 6 is a diagram illustrating a hash table that may be generated through the execution of a suffix tree clustering algorithm, according to an example embodiment.

FIG. 6 is a diagram of an example hash table 600 illustrating a data structure that may be used to store item data in the form of strings or substrings that may appear in, for example, various documents. These documents are, for example, advertisements for goods or services for sale. Illustrated at position 601 in the hash table is the substring "Lighter." This substring may roughly correspond to, for example, the node 13 referenced as 508 in FIG. 5. Adjacent to this position 601 is a position 602 that contains the substring "Bottle" wherein this substring "Bottle" roughly corresponds to the node 14 referenced as 510 in FIG. 5. Further, a position 603 in a hash table 600 contains the substring "Cap" and the set of documents containing the substring "Pepsi Cola Bottle Cap," which in this case is the set containing the document labeled as 0. This substring "Cap roughly corresponds to node 15 referenced as 512 in FIG. 5. At position 604 in a hash table 600, the substring "Opener" is illustrated as is the set containing documents 1, 0, and the set containing documents 4, 1. This substring opener roughly corresponds to node 16 referenced as 515 in FIG. 5 such that the string "Pepsi Cola Bottle Opener" may be generated through the clustering of various substrings within a hash table. At position 605, the substring "Coin" is illustrated wherein the substring "Coin" roughly corresponds to node 18 referenced as 511 in FIG. 5. At position 606, the substring "Bank" is contained wherein the substring "Pepsi Cola Coin Bank" is contained in documents 3 and 0. This substring "Bank" roughly corresponds to node 19 referenced as 514. Additionally, at position 607, the substring "Vintage" is contained wherein this substring roughly corresponds to node 3 referenced as 502. At position 608, the substring "Pepsi" is contained wherein the substring "Pepsi" roughly corresponds to node 4 referenced as 503. Additionally, at position 609, the substring "Cola" is shown wherein this substring roughly corresponds to node 5 referenced as 504. Further, at position 610 in a hash table 600, the substring "Bottle" is illustrated wherein this substring roughly corresponds to the node 6 referenced as 505. In some embodiments, hash clustering may be used as an alternative to the suffix tree as a data structure into which various substrings may be inserted. This hash table data structure may use standard hash clustering or may use bucket hashing depending upon the performance needs of a particular user or developer.

In some embodiments, once a trie is built, compaction occurs and base clusters are generated. A base cluster may be a set of electronic documents (e.g., online transactions) that share common phrases in their item titles, or other type of common string based data. A suffix trie is then constructed for the purpose of organizing these electronic documents so as to allow for the retrieval of relevant search results. For example, a suffix trie of a string "S" of words may be a compact trie containing all the suffixes of "S." Specifically, A suffix trie is a rooted directed tree;
Each internal node has at least 2 children;
Trie: Each edge is labeled with a non-empty substring of S. The label of a node is a concatenation of the labels of the edges on the path from the root to that node;
Compact property: No two edges out of the same node have edge labels that begin with the same word.

Figure 7:
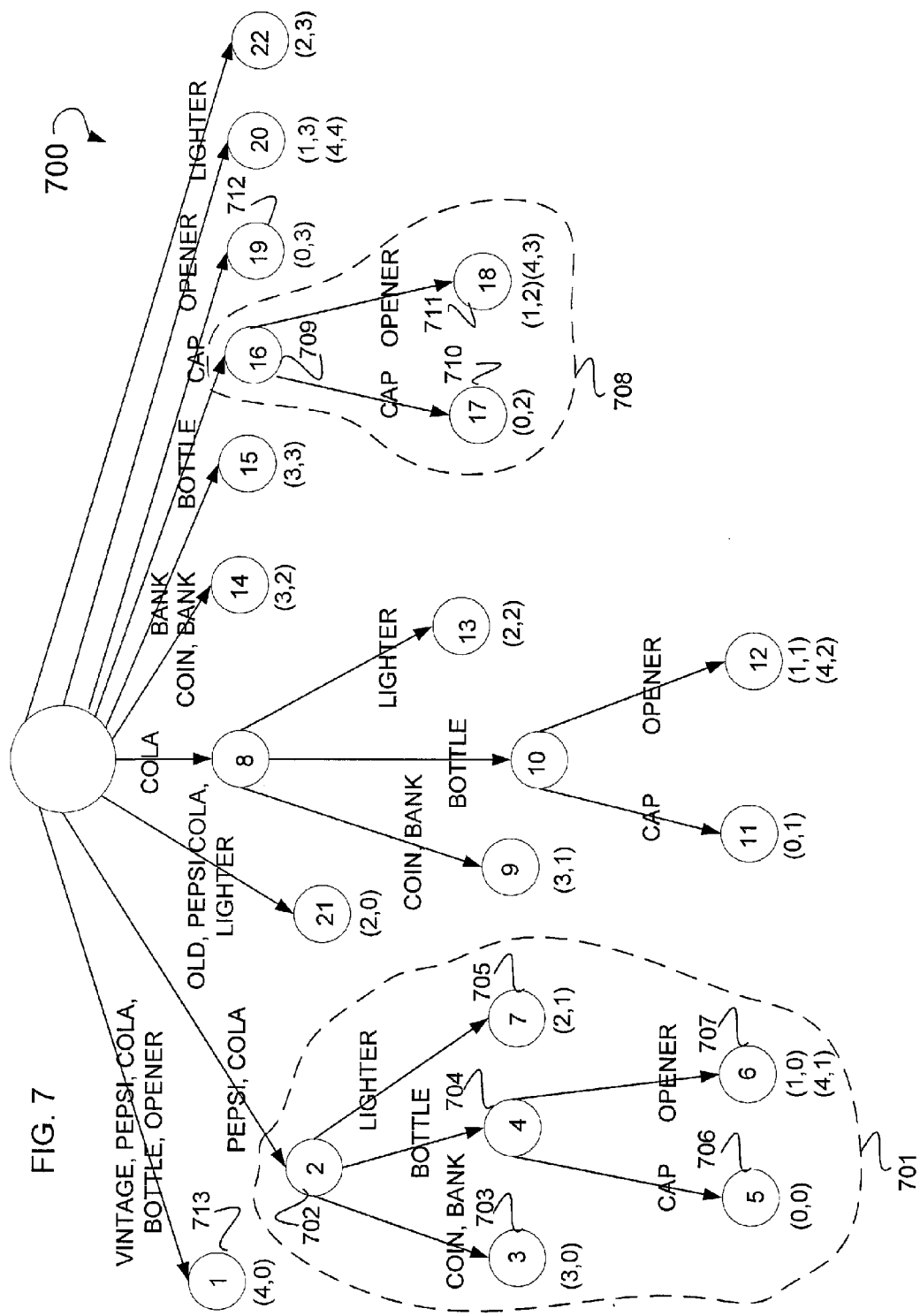
FIG. 7 is a diagram illustrating a compacted suffix tree, according to an example embodiment.

FIG. 7 is a diagram of an example compacted suffix tree 700. This compacted suffix tree 700 may have a number of properties. These properties include, for example, that each node in the compacted suffix tree represents a base cluster of documents generated through applying some type of logical operation (e.g., union, intersection, etc.) to eliminate duplicate substrings such that no two edges of the same node are labeled with strings or substrings beginning with the same words. A further property of this compacted suffix tree 700 may be that the path from a leaf node to the root node, and the edges along this path, may be combined to form a string or substring. Illustrated is a subtree 701, wherein a node 2 referenced as 702 is linked to a node 3 referenced as 703 such that the edge connecting node 2 and node 3 generates the substring "Coin Bank." Further, connected to the node 2, referenced as 702, is a node 4 referenced as 704 where an edge labeled "Bottle" connects node 2 and node 4. Moreover, a node 7 referenced as 705 is also connected to the node 2 referenced as 702 via an edge labeled as "Lighter." Node 3 referenced as 703 is a leaf node, such that documents 3 and 0 contain the substring "Pepsi Cola Coin Bank." Similarly, node 7 referenced as 705 is also a leaf node such that documents 2 and 1 contain the substring "Pepsi Cola Lighter." Connected to the node 4 referenced as 704 is a further node 5 referenced as 706 wherein node 4 and node 5 are connected with an edge labeled with the substring "Cap." Also connected to the node 4 referenced as 704 is a node 6 referenced as 707 wherein the edge connecting node 4 referenced as 704 and node 6 referenced as 707 is an edge labeled with a substring "Opener." Node 5 referenced as 706 is a leaf node such that document 0 contains the substring "Pepsi Cola Bottle Cap." Also, node 6 referenced as 707 is a leaf node such that documents 0, 1, and 4 contain the substring "Pepsi Cola Bottle Opener." Compacted suffix tree 700 contains a number of other subtrees. For example, a subtree 708 is also illustrated wherein this subtree 708 contains a node 16 referenced as 709. This node 16 referenced as 709 is connected to a node 17 referenced as 710 and a node 18 referenced as 711. Node 17 referenced as 710 is a leaf node, such that documents 0 and 2 contain the substring "Bottle Cap." Further, node 18 referenced as 711 is also a leaf node such that documents 1, 2, 3, and 4 contain the substring "Bottle Opener."

In some embodiments, not only may a plurality of nodes make up a subtree, but also a singular node may make up a subtree. For example, node 19 referenced as 712 is connected to the root node via an edge labeled "Cap," such that documents 0 and 3 contain the substring "Cap." Further, the node 1 referenced as 713 is a leaf node that references documents 0 and 4, such that documents 0 and 4 contain the substring "Vintage Pepsi Cola Bottle Opener." As will be more fully illustrated below, the various subtrees within this compacted subtree may again be reduced using certain principles of overlap and other types of factors as will be more fully discussed below.

Figure 8:
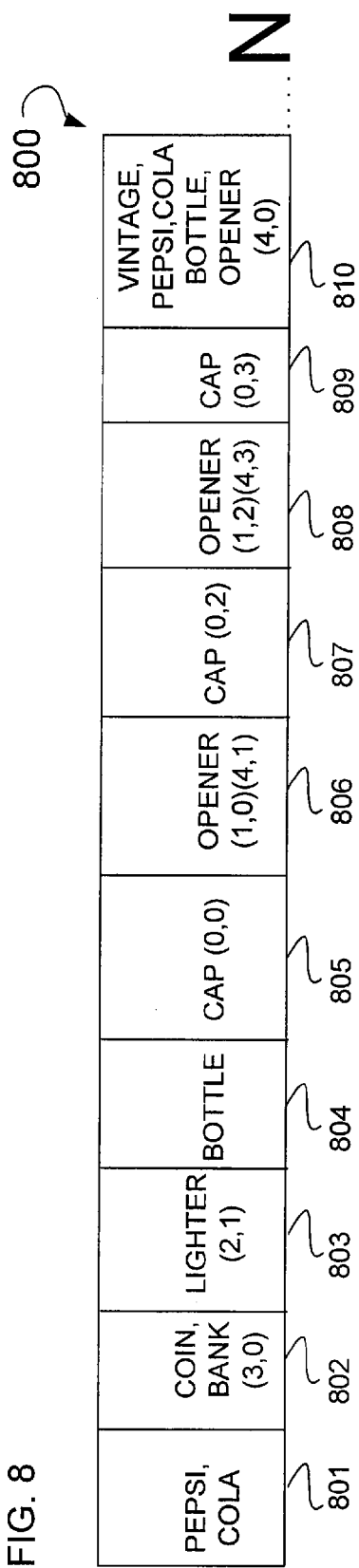
FIG. 8 is a diagram illustrating a hash table used to store base clusters of documents in the strings contained therein, according to an example embodiment.

FIG. 8 is a diagram illustrating an example hash table 800 used to store base clusters of documents. Illustrated is a position 801 that roughly corresponds to node 2 referenced as 702. Contained within this position 801 is a substring "Pepsi Cola." Additionally, a position 802 is illustrated that roughly corresponds to node 3 referenced as 703, wherein this position 802 contains the substring "Coin Bank" and also a reference to documents containing the substring "Pepsi Cola Coin Bank." Further, shown is a position 803 that roughly corresponds to node 7 referenced as 705 and, more specifically, the documents 1 and 2 that contain the substring "Pepsi Cola Lighter." Additionally a position 804 is illustrated that roughly corresponds to node 4 referenced as 704 that contains the substring "Bottle." Adjacent to position 804 is a position 805 that roughly corresponds to node 5 referenced as 706. This position 805 contains the substring "Cap" and additionally references document 0 as a document that contains the substring "Pepsi Cola Bottle Cap." At position 806 which roughly corresponds to node 6 referenced as 707 is the substring "Opener." Also shown are documents 0, 1, and 4 that contain a reference to the substring "Pepsi Cola Bottle Opener." At position 807 that roughly corresponds to node 17 referenced as 710 is the string "Cap," wherein this string "Cap" may be contained along with the string "Bottle" (e.g., "Bottle Cap") in documents 0 and 2. Further illustrated is a position 808 that roughly corresponds to node 18 referenced as 711 containing the string "Opener" and also documents containing the substring "Bottle Opener" (e.g., 1234). Additionally, a position 809 is illustrated containing the substring "Cap" wherein the substring "Cap" contains documents 0 and 3. This position 809 roughly corresponds to node 19 referenced as 712. Further, a position 810 is illustrated that roughly corresponds to node 1 referenced as 713 wherein this position 810 contains a string "Vintage Pepsi Cola Bottle Opener" and the documents that contain this substring (e.g., contained in the documents 0, 1 and 4).

The table depicted below shows for each intermediate node, the base cluster under that node, and the phrases (e.g., strings) and the documents that belong to the base cluster identified by these nodes.

| Node | Phrases | Items/Documents |
| --- | --- | --- |
| 1 | vintage pepsi cola bottle opener | {4} |
| 2 | pepsi cola | {0, 1, 2, 3, 4} |
| 3 | bottle | {0, 1, 4} |
| 4 | cola | {0, 1, 2, 3, 4} |
| 5 | coin | {3} |
| 6 | bank | {3} |
| 7 | cap | {0} |
| 8 | opener | {1, 4} |
| 9 | old pepsi cola lighter | {2} |
| 10 | lighter | {2} |

In some embodiments, each base cluster is assigned a score that is a function of the number of documents it contains and the words that make up its title. This function can be illustrated as follows:

Let Q be the set of base clusters;
Let P be the set of all phrases;
For a base cluster q in Q, with a phrase p in P, the score S is given by: $S(q)=|q|*f(|p|)$ where $|q|$ is the number of documents in the base cluster q, and $|p|$ is the number of words in p.

This function $S(q)$ may then be used in the combining of clusters outlined below.

Some embodiments may include sorting the compacted trie so as to order the nodes within the trie. For example, if key phrases can be extracted from the title of an item, then the nodes can be ordered based upon these extracted terms. This order may be ascending or decending. Further, once ordering occurs, then further compaction may take place for certain nodes, and their new position may be duplicative of other nodes.

Combining Clusters

Some embodiments may include strings that are common to more than one document. There might be significant overlap in the document sets between clusters. In some cases, similar clusters are identified, and those that are similar are merged. The idea is that clusters that have document sets that significantly overlap are probably related to the same theme and hence need to be merged. For example, given two clusters $q_i$ and $q_j$ with sizes $|q_i|$ and $|q_j|$, respectively, we can say bi and bj are 'similar' if $|q_i \cap q_j|/|b_i| > \mu$ and $|q_i \cap q_j|/|q_j| > \mu$, where $\mu$ is a predefined threshold. Similarity between clusters can be defined as a function $\zeta(q_i,q_j)=1$ if $|q_i \cap q_j|/|q_i| > \mu$ and $|q_i \cap q_j|/|q_j| > \mu$, and $=0$, otherwise.

Figure 9:
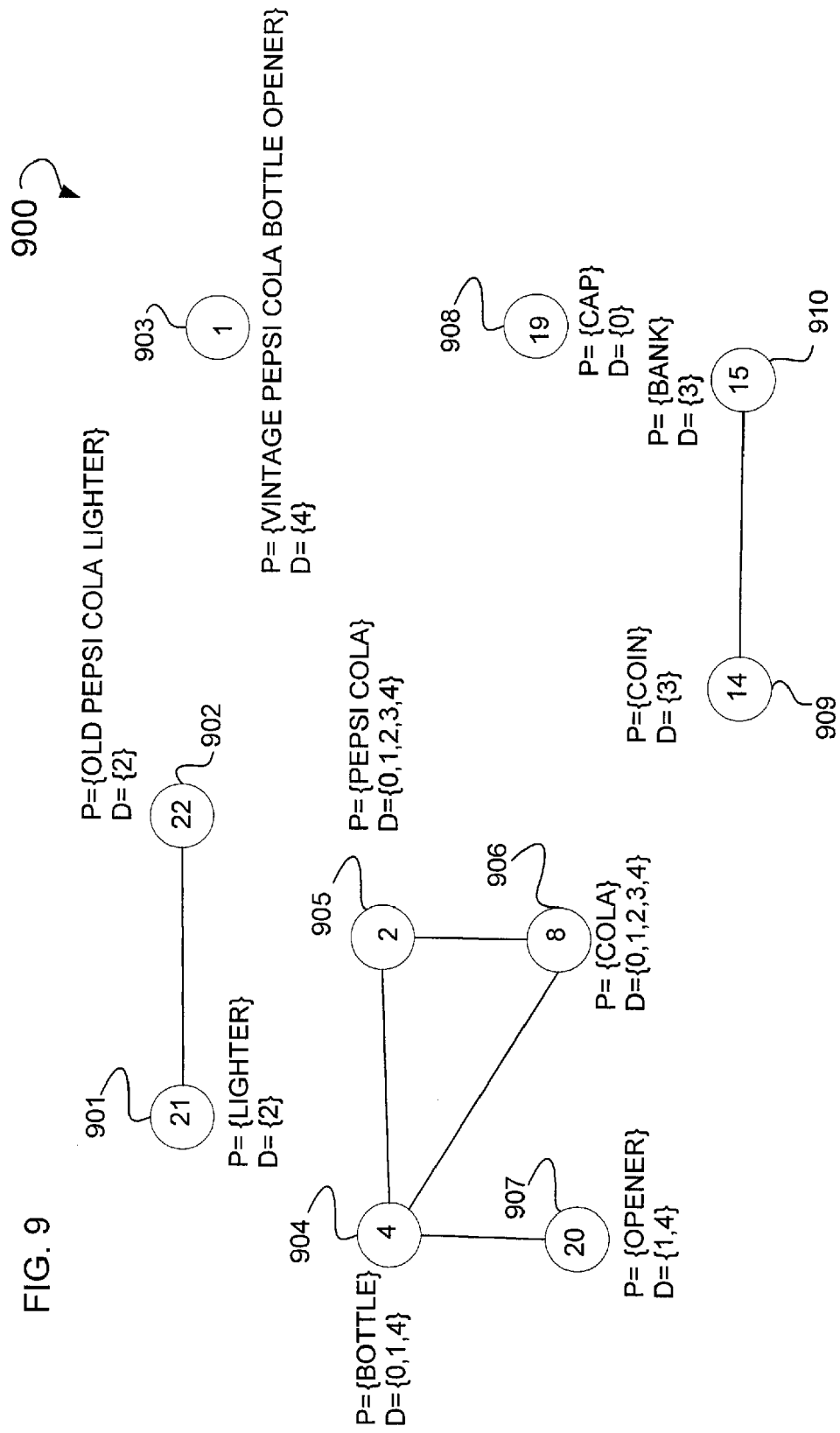
FIG. 9 is a diagram illustrating a merged cluster map, according to an example embodiment.

FIG. 9 is an example merger cluster map that may result from the combining of clusters based upon a $\mu$ value set to be 0.5. Illustrated is a merged cluster map 900 where nodes or, in some cases, data contained in hash table positions, are merged together based upon some type of predefined overlap value. This merging may be effectuated by, for example, using any one of a number of logical operations such as, for example, union, intersection, etc. Illustrated is a node 21 referenced as 901 that is connected bi-directionally to a node 22 labeled as 902. This node 21 references the substring "Lighter" and the document that contains the substring "Lighter" which, in this case, is document 2. Node 22 references the substring "Old Pepsi Cola Lighter" wherein the substring is contained also in document 2. Also illustrated is a node 1 referenced as 903 that roughly corresponds to nodes 713 and 810. This node has no edges and represents, for example, the substring "Vintage Pepsi Cola Bottle Opener" as it may appear in, for example, document 4. Also illustrated is a node 4 referenced as 904 that is connected to a number of other nodes via edges. For example, a node 20 referenced as 907 is connected to node 4 via a bidirectional edge, such that the substring "Bottle Opener" may be generated via the edge connecting node 4 (e.g., 904) and node 20 (e.g., 907). The substring "Bottle" associated with node 4 may be contained in documents 0, 1, and 4. The substring opener associated with node 20 may be contained in documents 1 and 4. Also connected to node 4 (e.g., 904) is a node 2 referenced as 905 and a node 8 referenced as 906. With regard to node 2, a substring "Pepsi Cola" is associated with this node 2 wherein the substring is contained in documents 0, 1, 2, 3, and 4. Associated with node 8 is a substring "Cola" that is contained in documents 0, 1, 2, 3, and 4. Additionally illustrated is a node 19 referenced as 908 that roughly corresponds to nodes 712 and 809. Associated with this node 19 is the substring "Cap" which may appear in, for example, document 0. Further illustrated is a node 14 referenced as 909 and node 15 referenced as 910 wherein this node 14and 15 are connected to a bidirectional edge. Associated with node 14 is the substring "Coin" that may appear in, for example, document 3, whereas associated with node 15 is the substring "Bank" that may be contained in document 3.

In some embodiments, bidirectional edges are used to connect the various nodes that make up this merged cluster map. In one case, the use of bidirectional edges denotes that the substrings or a combination of substrings may be searched or understood bi-directionally such that the substring "Old Pepsi Cola Lighter" may be held as an equivalent to "Lighter Cola Pepsi Old" for the purposes of searching and retrieving search results such as search result 114. Moreover, in certain cases, an overlap value may be based upon some percentile value wherein, for example, where there is a 50% overlap in documents containing strings or substrings, then the nodes that reference these strings or substrings may be merged with other nodes containing similar (e.g., at least 50% similar) similarity. In addition to a bare overlap value, additional factors such as a relevancy weighting factor, a seller factor, a price factor, a category factor, an image factor or some other suitable factor may be used as a basis for merging clusters. Further, these clusters are built purely based on the title text and not based on any additional information available in the transaction. For example, we could use price information as an additional parameter into the clustering system, such that clusters that are closer to each other in the price range might contribute as additional factor for merging criteria.

In some embodiments, the various clusters illustrated in FIG. 9 can be shown as various numerical scores. For example, the clusters in FIG. 9 may be merged into five clusters as given below:

Cluster 1={2} with phrases {"Old Pepsi Cola Lighter", "Lighter"}, score=2;
Cluster 2={4} with phrase {"Vintage Pepsi Cola Bottle Opener"}, score=1;
Cluster 3={0} with phrase {"Cap"}, score=1;
Cluster 4={3} with phrases {"Coin", "Bank"}, score=2;
Cluster 5={0, 1, 2, 3, 4} with phrases {"Pepsi Cola", "Cola", "Bottle", "Opener"}, score=20.

Multi-Factor Clustering

In some cases, the clustering search results with the standard STC algorithm do not take into account other factors that may influence the quality of clusters. Using the STC algorithm, the title text may be the only parameter for the clustering system. In some cases, however, the title information alone may not suffice for retrieving. Additional factors may need to be taken into consideration during the clustering process. For instance, one factor to be used could be the demand factor which, in one embodiment, is the relationship of items and categories to the query terms. Other factors may include the price of the items, the sellers, feedback, the categories into which the items belong, and other suitable categories. These factors may be applied at any one of the stages of filtering out noise, building an uncompacted trie (e.g., data structure), building a compacted trie (e.g., data structure), building the merged cluster map, or even after these stages.

Demand Factor

In some embodiments, the demand factor indicates what buyers search for and click on based upon the search query. This factor may, for example, be applied during the filtering of noise data. The demand factor may be computed based upon the relationships of items and categories to query terms generated via, for example, a user's actions (e.g., their selection by a user using a mouse or other input device) Further, the demand factor can play a role in improving the quality of clusters. Consider the following item listings:

"STUNNING BLING SWAROVSKI CRYSTALS 4 GB 4 GB IPOD NANO";
"SEALED APPLE IPOD 2 GB BLACK MP3 NANO+ FREE GIFT HOT";
"HOT!! AMAZING GREEN PEACOCK IPOD NANO SKIN".

The first two listings illustrate the ipod nano, while the third listing illustrates the ipod nano skin. From the above example, the titles of the listings could have some number of superfluous words which may not be necessary for the processing in the STC algorithm, but are typically entered by sellers (e.g., during the course of providing item listing data, or otherwise populating, for example, the item listing database) to attract a buyers' attention. Given these superfluous words, it may be important to identify only the relevant/important words in an item listing to the extent they can help improve the relevancy of the cluster tags and the recall of the algorithm.

Taken within the context of a search query, demand data could be explained in the following manner. Given a query q we could classify the demand data relevant to q in two ways. For example if the query q is "johnny depp" the demand data could be gathered by examining contained and related queries. Contained queries may be all the demand data/queries entered by users which have the query q contained in the queries. For example for a query "johnny depp," the contained queries can be "johnny depp dvd," "johnny depp purse," "johnny depp doll," "johnny depp shirt," and "johnny depp photo.s" By contrast, related queries of query Q may be those queries entered by those users who searched for Q. Example related queries for "johnny depp" include "Edward scissorhands" and "pirates of Caribbean signed poster."

The below table shows the impact of the demand factor, and its ability to help improve the quality of clusters.

| Clusters Without Demand Factor | Clusters With Demand Factor |
| --- | --- |
| 10 × 13 | 7 × 10 |
| 411 × 411 | 8 × 11 |
| 4 × 6 | 9 × 12 |
| 6 × 8 | antique |
| antique | area rug |
| area | bakhtiar rug |
| bakhtiar rugs | balouch rug |
| balouch rugs | bidjar |
| bidjar | black |
| black | blue |
| bokhara | bokhara |
| carpet | carpet |
| cat | cat |
| decor | color |
| free sh | decor |
| gabbeh | design |
| genuine | ecg |
| gulf | gabbeh |
| hamedan | green |
| hand | gulf |
| hand made | hand |
| hand woven | hand made |
| handknotted | hand woven |
| handmade | handmade |
| heriz | heriz |
| indo | indo |
| isfahan | kashan |
| kashan | kashmar |
| kashmar | kilim |
| kerman | kitten |
| kilim | nain |
| kitten | mashad |

-continued

| Clusters Without Demand Factor | Clusters With Demand Factor |
|---|---|
| koliaei rugs | medallion |
| lamb | meshkabad |
| littlest pet shop | meshkin rug |
| malayer | old |
| mashad | oriental |
| medallion | pottery barn |
| meshkabad | red |
| meshkin rugs | round |
| nain | rug |
| navy blue | runner |
| of | salt |
| old | sarouk |
| oriental | shirazi rug |
| pottery barn | silk |
| qashqai | silver |
| rug | tabriz |
| rugs | tribal |
| runner | turquoise |
| salt | vintage |
| santique | white |
| sarouk | wool |
| ship fee | |
| shiraz | |
| shirazgabbeh | |
| shirazi rug | |
| shirazkilim | |
| silver | |
| size | |
| style | |
| sumak kilim | |
| super | |
| tabriz | |
| turquoise | |
| vintage | |
| white | |
| wool | |
| xmas | |

In the above table, the column on the left displays the clusters when the demand data is not taken into account, while the column on the right displays the clusters when demand data is taken into account. Clusters like "free ship," "ship fee," "size," and "super" are all eliminated when the demand data is taken into account.

In some embodiments, the demand factor and the relationship of items and categories to the query terms may be represented using one or more Artificial Intelligence (AI) based structures and algorithms. For example, the relationship between an item and/or category and a query term may be represented via a decision tree or bayesian network wherein the item and/or category and query terms form nodes in this network that are connected with various weighted edges or links, wherein the weights are probability values relating to the probability of a relationship between the item and/or category and query terms. The nodes of the network may then be traversed based upon the weighted values expressed in the edges. Decision trees or bayesian networks are not the only type of AI based structure that may be employed, for other types of AI structures and algorithms may be utilized to understand the relationship between the item and/or category and query terms.

AI structures, and the algorithms that underlie them, used to ascertain a relationship between an item and/or category and query terms fall into one of two categories: deterministic or stochastic. Some example deterministic algorithms include case-based reasoning, the aforementioned bayesian networks (including hidden markov models), neural networks, or fuzzy systems. The bayesian networks may include: machine learning algorithms including—supervised learning, unsupervised learning, semi-supervised learning, reinforcement learning, transduction, learning to learn algorithms, or some other suitable bayesian network. The neural networks may include: kohonen self-organizing network, recurrent networks, simple recurrent networks, Hopfield networks, stochastic neural networks, boltzmann machines, modular neural networks, committee of machines, Associative Neural Network (ASNN), holographic associative memory, instantaneously trained networks, spiking neural networks, dynamic neural networks, cascading neural networks, neuro-fuzzy networks, or some other suitable neural network. Example stochastic algorithms include: genetic algorithms, ant algorithms, tabu search algorithms, or monte carlo algorithms (e.g., simulated annealing). Common to these algorithms is the use of randomness (e.g., randomly generated numbers) to avoid the problem of being unduly wedded to a local minima or maxima.

Relevance-Weighting Factor

Some embodiments may include the use of a relevance-weighting factor to generate a purely statistical measure to produce a list of keywords (e.g., corresponding to a particular query) that may appear in search results. This factor may, for example, be applied just before the generation of the merged cluster map. These keywords may be words that are extremely relevant, or even totally irrelevant, to a particular query. The resulting statistical measure or score is achieved by looking at, among other things, the historical information of the query terms typed by the user, the set of results returned, and the set of results that the user actually clicked through.

For example, suppose that for the query term "dell laptop" the results returned included "dell laptop bags," "dell laptop batteries," "dell laptop cases," and "dell laptop d410." If most users clicked on "dell laptop d410," then d410 would be more relevant and the terms bags, batteries, and cases would be less relevant. And again, if, for example, we were to search for "Persian rugs," a table could be generated containing a list of words with assigned weighting:

| Terms | Relevance Weights |
|---|---|
| Antique | 0.632 |
| Engraved | 0.5 |
| Italian | 0.5 |
| Knotted | 1.017 |
| Rare | 0.33 |
| Black | 1.211 |
| 10 × 3 | 0.5 |
| Oriental | 0.5 |
| Silver | 0.587 |
| Beautiful | 1.5 |
| Rugs | 1.741 |

In the above table, outlines query relevance weights for the query "Persian Rugs." Terms with weight less than 0.5 may be considered irrelevant. Based on the returned percentage values, terms like: Knotted, Black, Antique, Beautiful, and Rugs are important (e.g., weight is $\geqq 0.5$) while Rare, Oriental, and Italian are less relevant (e.g., weight is $\leqq 0.5$).

Additionally, from the above table various conclusions can be drawn. First, it can be inferred that the seller uses terms like Oriental and Italian to attract buyers, but the buyer behavior states that these are less relevant to the term "Persian Rugs." Moreover, words with weights closer to 2 are words that are most relevant to the query, and words with weighting lower than 1 are words that are irrelevant to the query. Here, for the purpose of simplicity, the relevance weights have been normalized to range from 0 to 2. Based on the above table, we can say that words like "antique," "knotted" and "rugs" are indeed relevant to the query "Persian Rugs." In some embodiments, this form of weighting may be primarily used to filter out "good" search results from a pool of random results.

Seller Factor

In some embodiments, a factor that takes into account the overlap of sellers between clusters may enforce the sanctity or legitimacy of the merge. The use of seller information to influence the clustering process is based upon the assumption that sellers who sell similar items tend to appear in related clusters. For instance, assume there are two base clusters in the merging phase (e.g., when base clusters are identified) with the tags "ipod nano 4 gb" and "ipod nano 2 gb." Using the standard merge threshold (e.g., 0.5), these two clusters may never have been merged if it didn't satisfy the basic merge criterion. Hence, a second measure that takes into account the overlap of sellers between clusters may be needed to enforce this necessary underlying relationship. When the overlap of sellers between the two base clusters mentioned above is high (e.g., >0.5) and the two base clusters have a reasonable merge score below the threshold, we can then allow this merge which otherwise would have been declined but for the use of the seller factor.

Price Factor

Some embodiments may also use price to measure the effectiveness of a cluster. This factor may, for example, be applied just before the generation of the merged cluster map. For example, in certain cases a fixed price exists for an item offered for sale (e.g., a "buy it now" price). One purpose of this fixed price is to be able to purchase an item immediately without having to go through, for example, an auctioning process. Assuming an efficient market, the "buy it now" price may be a reasonable price for that item. Applied to the clustering context, assume we have a cluster that is solely related to "ipod nano 4 gb black." If we take all the new items within this cluster, intuitively the "buy it now" prices within this cluster should not vary beyond a certain point. Therefore, by using a function of simple statistical measures like the mean, mode and variance, it may be possible to measure the cohesiveness of clusters. If, in applying one of these measures, the prices vary a little too much, this is may be an indication of a bad cluster, and the cluster may be dropped, or discarded. Likewise, if the function of the mean, mode and variance indicate that the prices within the cluster are indeed consistent, then this would be a signal of a tight cluster.

Category Factor

Example embodiments may also include a category factor, wherein the association between items in a category in a database is taken into account when generating clusters. This factor may, for example, be applied just before the generation of the merged cluster map. For example, while a seller mostly lists items under the correct category, the complexity of the category structure and the seller's own motive might preclude items from going into the correct categories. Correctness here may be understood as based upon certain norms related to the categorization of items for sale. Here a category factor could be used to mean that items belong to the same category and to indicate that the items in the cluster are homogeneous.

Image Factor

In some embodiments, items have images attached to them. Image similarity can be used as a factor for clustering. This factor may, for example, be applied just before the generation of the merged cluster map, assuming, for example, that comparing similar items visually could also be a useful factor. Specifically, the strength of a cluster (e.g., the extent to which it is homogenous) may be based upon a correspondence between the image of a query (e.g., query 108) and the images of the query results as existing in clusters.

An Additional Approach to Multi-Factor Clustering

In some embodiments, an additional approach to multifactor clustering is implemented that supplements, or in some cases replaces the multi-factoring approach outlined above. This approach may be applied after, for example, a merged cluster map is built.

Demand Factor

Some embodiments may include demand data that is utilized in an additional approach to improve the relevancy of clusters extracted and prune the irrelevant clusters or phrases for the given query Q (e.g., query 108). In some cases, there could be some phrases in the search results that occur frequently, but might not be very relevant to the current input query from the user. These may need to be removed or pruned, for such phrases may not be relevant to the current input query. One may, for example, compute a relevancy score for each cluster, and keep those clusters that are appropriate for the current input query.

This concept of pruning may be illustrated in the following manner. For a phrase P, several demand attributes may be used for demand factor analysis. These demand attributes are collected by aggregating activity of several users who searched for a keyword P. These activities may include:

NBids: number of bids placed immediately after searching the phrase P;

No. of View Item Counts: Number of items viewed by the user immediately after searching the phrase P;

Category histogram of view item counts: Histogram of view item counts grouped by the category for the phrase P.

Relevancy Score

Once the demand attribute data is collected, a relevancy score may be computed. The relevancy score of a cluster may be computed to determine how relevant the cluster is with respect to a given input query. Several factors may be utilized to compute the relevancy score of a cluster including demand attributes and category histogram match score. The relevance score of cluster may be weighted over several such factors. In some embodiments, the weights are normalized to a sum of one over all the factors involved (e.g., 1/factors involved). New attributes can be added into the computation of relevancy score and the weights can be tuned so that appropriate relevancy can be achieved. For example, the below equation illustrates how a relevancy score might be generated where $C_{Rel}$, is the relevancy score, $CHM_{score}$ is a category match histogram score, NBids is the number of bids, VItemCounts is the number of views, and $w_1$, $w_2$, and $W_3$ represent a number of weighting factors together expressed as:

$$C_{Rel} = w_1 * CHM_{score} + w_2 * NBids + w_3 * VItemCounts$$

such that: $\Sigma w_i = 1$

With regard to the $CHM_{score}$, this score is may be computed to measure how closely the demand category histogram of the cluster C matches the supply category histogram of the original query Q. Several histogram distance measures may be used including Euclidean and intersection measures are analyzed and can be used to compute the category histogram match score.

In some embodiments, a relevancy score may be computed for an example cluster such as is illustrated below:

Relevancy Scores for example clusters of query "johnny depp"

| Cluster Name | Relevancy score |
| --- | --- |
| "pirates of the caribbean movie poster" | 0.0129 |
| "from hell" | 0.6667 |
| "hell" | 0.8154 |

-continued

| Cluster Name | Relevancy score |
|---|---|
| "wow" | 0.9133 |
| "edward" | 0.9295 |
| "edward scissorhands" | 0.3259 |
| "orlando" | 0.9507 |
| "orlando bloom" | 0.1747 |

Using this table, and the results contained therein, the lower a relevancy score, the more relevant a cluster is with respect to an input query Q. The above table shows the relevancy scores of some example clusters extracted for the input query "johnny depp". Based upon this input query (e.g., query 108), we can see that the cluster "from hell" is more relevant than the cluster "hell" for the input query "johnny depp". Similarly, "edward scissorhands" is more relevant than the phrase "Edward" and "orlando bloom" is more relevant than the cluster "orlando". Moreover, we also see that the cluster "pirates of the Caribbean movie poster" is very relevant to the input query "johnny depp" while the cluster "wow" carries a low relevancy score. Many filters may be designed to make use of the relevancy score and prune irrelevant clusters. In one embodiment, threshold "t" is computed by taking the weighted average of the relevancy scores of all the clusters and keeps only the clusters whose relevancy score is less than the threshold "t". In a further embodiment, the clusters are sorted in ascending order based on the relevancy score and the top "N" clusters based on the relevancy score are kept and remaining clusters are removed from consideration.

Example Logic to Build an STC

Figure 10:
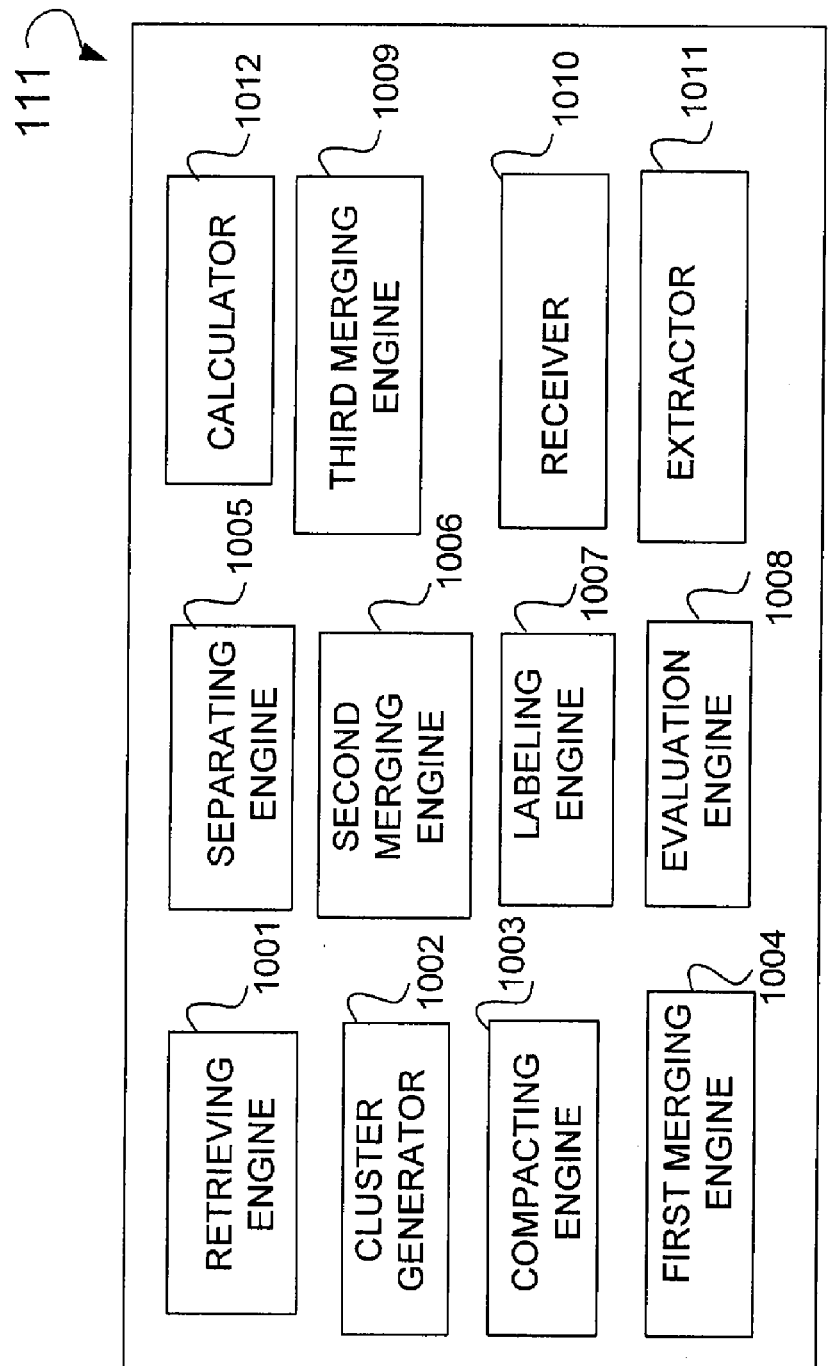
FIG. 10 is a block diagram illustrating an application server, according to an example embodiment.

FIG. 10 is a block diagram of an example computer system such as the application server 111. The various blocks illustrated herein may be implemented in hardware, firmware, or even software. Illustrated is a retrieving engine 1001 to retrieve item data from a plurality of listings, the item data filtered from noise data, a cluster generator 1002 to construct at least one base cluster having at least one document with common item data stored in a suffix ordering, a compacting engine 1003 to compact the at least one base cluster to create a compacted cluster representation having a reduced duplicate suffix ordering amongst the clusters, and a first merging engine 1004 to merge the compact cluster representation to generate a merged cluster, the merging based upon a first overlap value applied to the at least one document with common item data. In some embodiments, the item data includes at least one of an item title, an item category, and seller information. Additionally, the item data may be part of a plurality of merged clusters organized into a hierarchy of merged clusters. Some embodiments may include a separating engine 1005 to filter item data from noise data based upon a frequency with which a word is used in a search as compared to a frequency another word is used in the search. Also, the suffix ordering may be stored in a data structure that includes at least one of a trie, a hash table, a binary search tree, a red-black tree, and a heap. In some embodiments, a second merging engine 1006 is implemented to merge the compact cluster representation based upon at least one of a demand factor, a relevance-weight factor, a seller factor, a price factor, a category factor, and an image factor. Additionally, a calculator 1012 may be implemented to calculate a relevance score using the demand factor, the relevance score calculated, in part, based on a comparison of a similarity of a demand category histogram, and a supply category histogram. Moreover, a labeling engine 1007 may be implemented to label the at least one base cluster. Further, an evaluation engine 1008 may be implemented to evaluate the merged cluster to determine a coverage value for the merged cluster, and a second overlap value relating to the at least one documents contained within the merged cluster. A third merging engine 1009 may be implemented to merge the compacted cluster representation to generate a merged cluster based upon the coverage value and the second overlap value. A receiver 1010 may be implemented to receive a search query, the search query relating to item data, as well as an extractor 1011 to extract the item data from the merged cluster as a search result, the search result extracted based upon a similarity between the search query and the item data.

Figure 11:
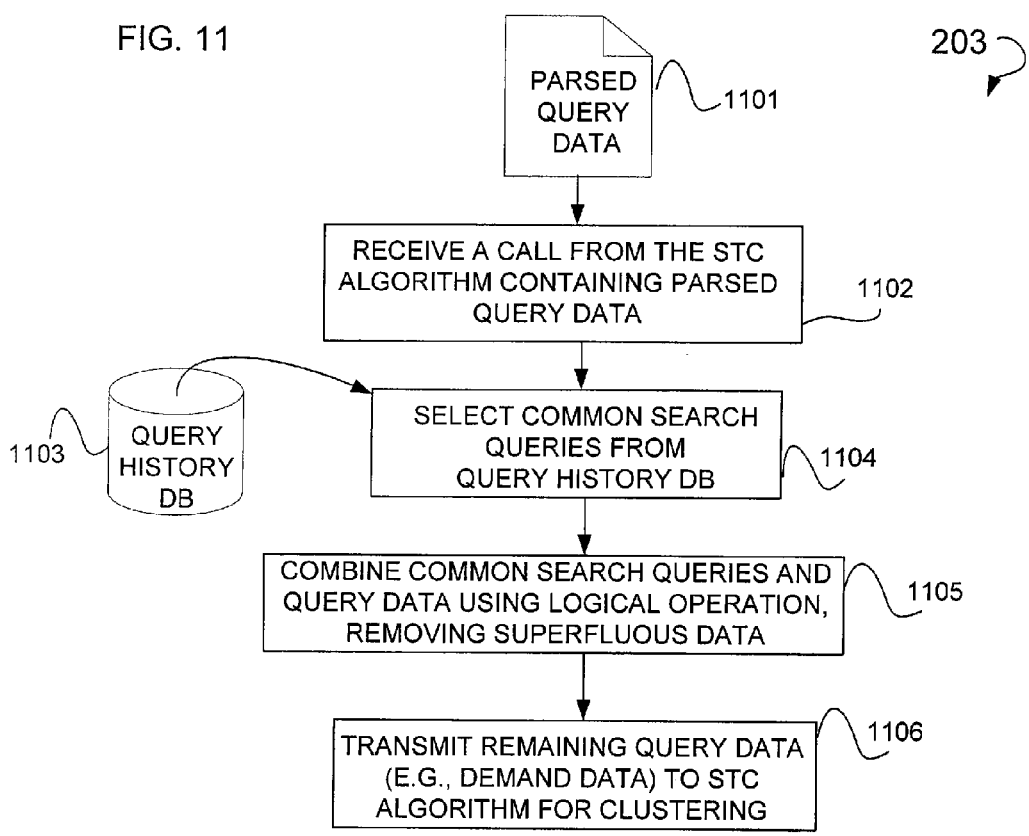
FIG. 11 is a flowchart illustrating a method used to implement a demand data engine, according to an example embodiment.

FIG. 11 is a flowchart illustrating an example method used to implement operation 203. Illustrated is parsed query data 1101 that is received through the execution of an operation 1102, wherein operation 1102 is initiated through receiving a call from an operation implementing the STC algorithm. Next, an operation 1104 is executed that selects common search result queries from, for example, a query history database 1103. Once these common search queries are selected, based upon, for example, similarities amongst strings or substrings, an operation 1105 is executed that combines the common search queries and query data taken from the parsed query data 1104 using some type of logical operation, wherein this logical operation may be, for example, a union operation, intersection operation etc. This logical operation removes superfluous or redundant strings or substrings from the data. Next, an operation 1106 is executed that transmits the remaining query data (e.g. demand data) to the STC algorithm for clustering.

Figure 12:
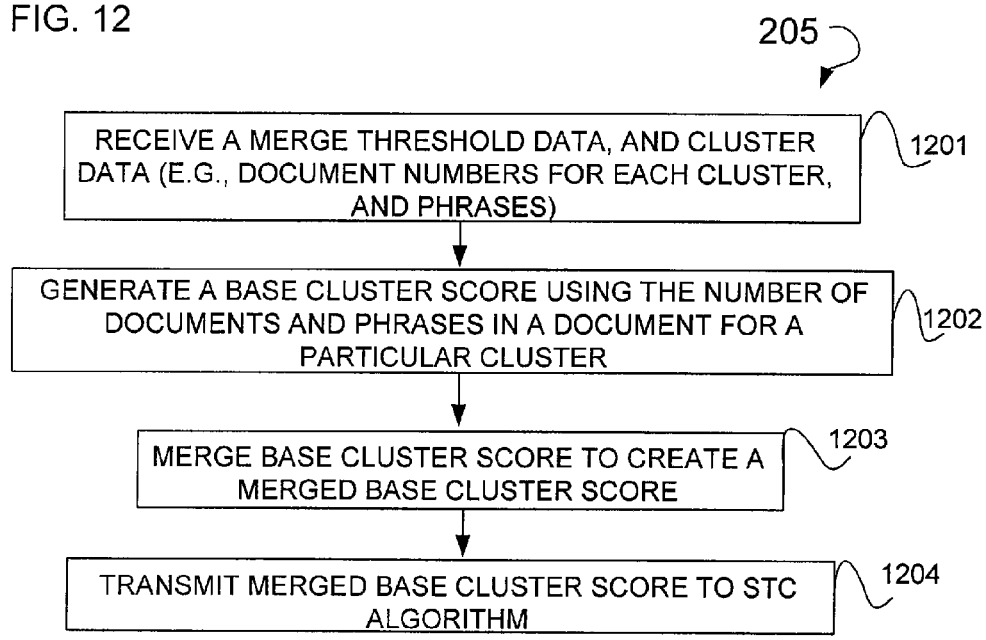
FIG. 12 is a flowchart illustrating a method used to implement an operation that computes a base cluster score using the merged threshold data, according to an example embodiment.

FIG. 12 is a flowchart illustrating an example execution of a method used to implement operation 205. Illustrated is an operation 1201 that receives merged threshold data and cluster data in the form of document numbers for a particular cluster and phrases or substrings for each one of those clusters. Next, an operation 1202 is executed that generates a base cluster score using documents and phrases in a document for a particular cluster. Once the base cluster score is generated, an operation 1203 is executed that merges the base cluster scores to create a merged base cluster score. This merged base cluster score is then provided to an operation 1204 that transmits the merged base cluster score to the STC algorithm for further processing.

Figure 13:
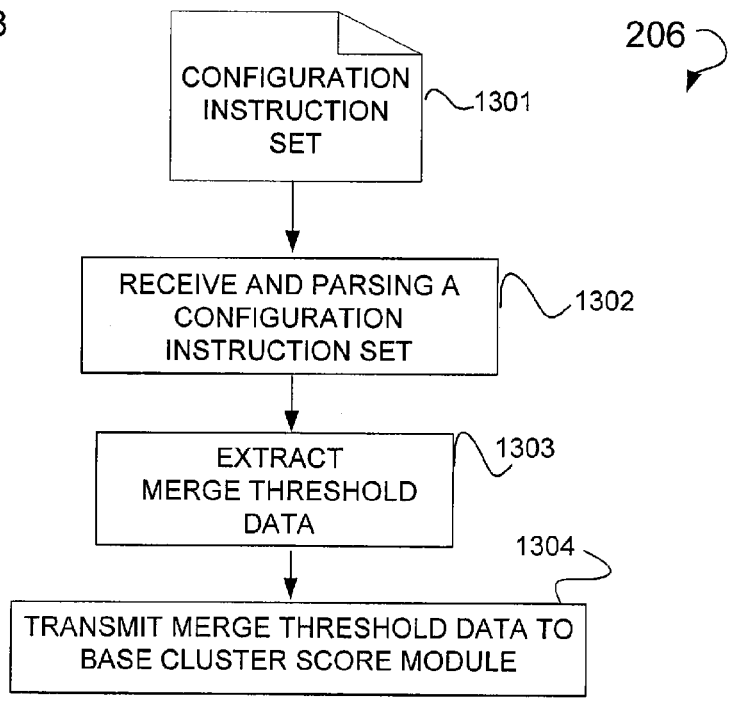
FIG. 13 is a flowchart illustrating a method used to implement an operation that provides merged threshold data, according to an example embodiment.

FIG. 13 is a flowchart illustrating an example method used to implement operation 206. Illustrated is a configuration instruction set 1301 that is received or processed through the execution of operation 1302. Once operation 1302 is executed, and the configuration instruction set is received and parsed, an operation 1303 is executed that extracts merged threshold data. This merged threshold data may be, for example, the 50% overlap value previously referenced or may be, for example, any one of the previously referenced factors (e.g., relevance weighting factor, selling factor, price factor, category factor, image factor etc.). Once the merged threshold data is extracted, an operation 1304 is executed that transmits the merged threshold data to base cluster score module.

Figure 14:
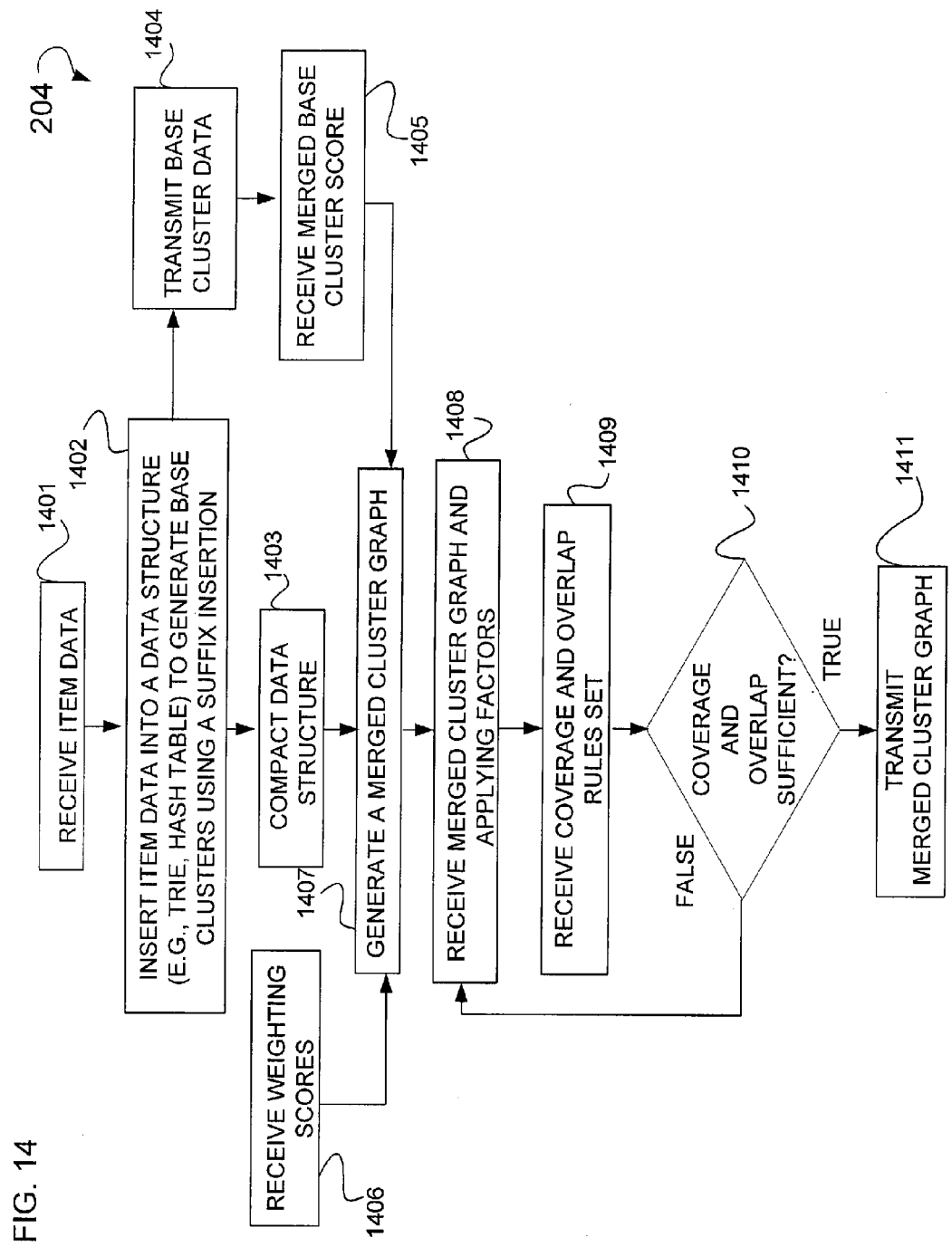
FIG. 14 is a flowchart illustrating a method used to implement or execute a suffix tree cluster algorithm, according to an example embodiment.

FIG. 14 is a flowchart illustrating an example method used to implement or execute operation 204. Illustrated is an operation 1401 that receives item data. This item data may be, for example, the previously illustrated data relating to a sale or advertisement for the sale of a good or service, where this advertisement is considered a document. Next, an operation 1402 is executed that inserts item data into a data structure to generate a base cluster using suffix insertion. In some embodiments, this data structure may be, for example, a trie, a hash table, or some other data structure that provides for constant time (e.g., O(1)) or near constant time performance for insertion and searching. Next, an operation 1404 is executed that transmits base cluster data. Once transmitted, an operation 1405 is executed that receives a merged base cluster score from, for example, the execution of operation 205. Next, an operation 1403 is executed that acts to compact the data structure as, for example, illustrated in FIG. 7. Then, an operation 1406 is executed that receives weighted scores, wherein these weighted scores are received through the execution of operation 201. Upon the execution of operations 1406, 1403 and 1405, an operation 1407 is executed that generates a merged cluster map as is depicted in, for example, FIG. 9. Next, an operation 1408 is executed that receives the merged cluster map and applies various factors including, for example, the relevancy weighting factor, selling factor, price factor, category factor, and image factor. These various factors may be applied during the course of the execution of operation 1408 in combination with, or in lieu of, the execution of operation 1303. Next, an operation 1409 is executed that receives the coverage and overlap rule set, wherein this information is received from, for example, the execution of operation 206. Then, a decisional operation 1410 is executed that determines whether the coverage and overlap is sufficient for the purposes of facilitating, for example, broad coverage with minimal overlap. In cases where decisional operation 1410 evaluates to "false", the operation 1408 is re-executed as are the operations subsequent to 1407. In cases where decisional operation 1410 evaluates to "true", an operation 1411 is executed that transmits a merged cluster map that has been optimized through, for example, the application of various overlap factors and other types of factors (e.g., relevancy weighting factor, selling factor, price factor, category factor, image factor etc).

Cluster Expansion

In some embodiments, the STC algorithm takes into account the order of the phrases when base clusters are formed. For example, for a base cluster "ipod nano" only those items that have the exact phrase "ipod nano" in the same order are included in the clustering. However, some sellers might enter the words "ipod," and "nano" in their listings, but in different order and possibly separated by other words. Penalizing these items for not in the right order would affect the recall of the algorithm. On the other hand, if we ignore the order of the words when the data is input to the algorithm, a large number of low quality clusters would be output. Some embodiments may include taking into account the order of the words illustrating an item when the initial clusters are formed. Then, however, we explore the remaining unclustered documents and check if each of them can be added to the clusters formed by not taking the order of the words into account.

Labeling Algorithm

In some embodiments, cluster labels are used to depict compact information about the type of documents present in the cluster. The labels may act as navigation criteria for the user 101. In one embodiment, the cluster label acts as the label of the base cluster that contains the highest number of documents. In another embodiment, the labeling of the cluster is performed using the most frequent phrases in the cluster.

In some embodiments, the actual labeling is implemented using the Cluster Tags Extraction ($CLE^{Tags}$) approach or the Best Document Extraction ($CLE^{BD}$) approach. In the $CLE^{Tags}$ approach, an important multiple tags concepts within the cluster is applied, while in the $CLE^{BD}$ approach, the best document (e.g., a centroid or average) that best represents the majority of the documents within the cluster is selected. As will be more fully illustrated below, the terms frequency score, density score, and document score address how to compute different term statistics used to extract cluster labels. In contrast, $CLE^{Tags}$ and $CLE^{BD}$ address how to extract labels using these statistics.

Some embodiments may include defining the Cluster Term Frequency ($CTF_i$) of phrase p, with respect to cluster $C_i$, as the number of documents or titles that contain the phrase p. In some embodiments, we would ignore common stop words and also duplicate occurrences of the same word or phrase in any document or title. Further, a phrase p could be defined as strongly present in a cluster $C_i$ if the $CTF_i$ of p is above a threshold $F_r$. The property of being strongly present is boolean (e.g., a phrase is strongly present or not). Next, we define the Term Density (TD) score of a phrase p as the number of clusters in which phrase p is strongly present.

Example embodiments may include defining a document score. Let us assume the document $d_x$ of Cluster $C_i$ has a collection of m phrases $P_{x1}, P_{x2}, \ldots, P_{xn}$ which are strongly present. A Cluster Document Score (CDS) of document dm with respect to cluster $C_i$ could be defined as: $CDS_{im} = w1*m + w2*\Sigma CTF_i(P_{xk}) k=1 \ldots m$, where w1 and w2 are pre-chosen weights.

In some embodiments, a $CLE^{Tags}$ approach is implemented wherein tags or phrases are extracted that represent important concepts within a cluster. Tags extracted this way may be used to navigate across the items within the cluster based on the chosen tags. Specifically, for each cluster we extract all the strongly present phrases in the cluster in which a TD score is less than a threshold term density score ($Th_{TD}$). $Th_{TD}$ may be defined as the NumOfClusters/4 (e.g., we pick all the strongly present phrases in the cluster $C_i$ which are not present in more than $Th_{TD}$ of the clusters globally). In this way, tags are identified that most represent a cluster in a way that it is reasonably distinguished from others.

A $CLE^{BD}$ approach may be implemented, in some embodiments, where one would like to have the single best concept within the cluster rather than multiple tags that could occur within the cluster. The single best concept could be extracted by selecting the best document that best represents the majority of the other documents within the cluster. This may be accomplished in the following manner, one could rank all the documents in the Cluster $C_i$ based on document score (e.g., creating a CDS value), and picking the best document that has the highest document score. Next, the cluster label of $C_i$ is picked as a sequence of all the strongly present phrases in the selected best document.

Figure 15:
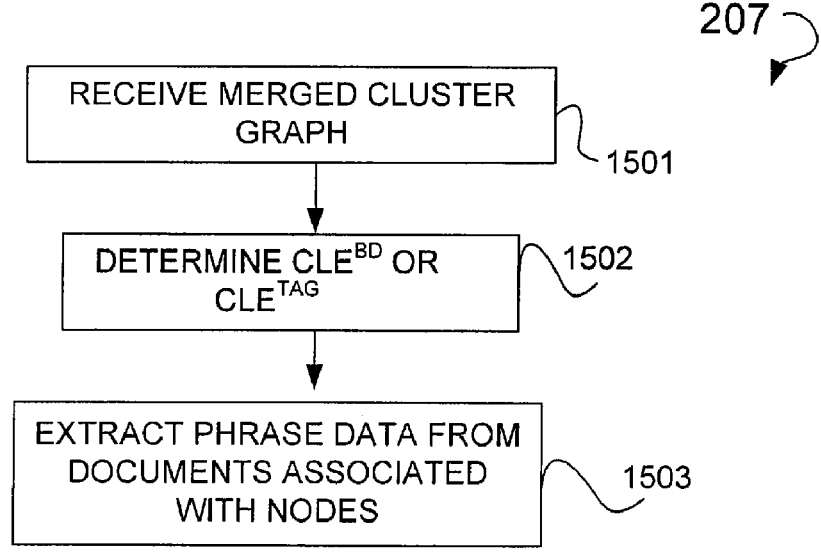
FIG. 15 is a flowchart illustrating a method used to execute an operation that labels various clusters, according to an example embodiment.

FIG. 15 is a flowchart illustrating an example method used to execute operation 207. Illustrated is an operation 1501 that receives a merged cluster map, such as that depicted in FIG. 9. Once received, an operation 1502 is executed that determines how to label each node of the graph using, for example, a $CLE^{BD}$ or, for example, a $CLE^{Tags}$ approach. Next, an operation 1503 is executed that extracts phrase data (e.g., strings or substrings) from documents associated with nodes. This phrase data may later be used as, for example, search results provided to, for example, a user 101 in response to a search query, such as query 108.

Presenting Clustered Search Results

Figure 16:
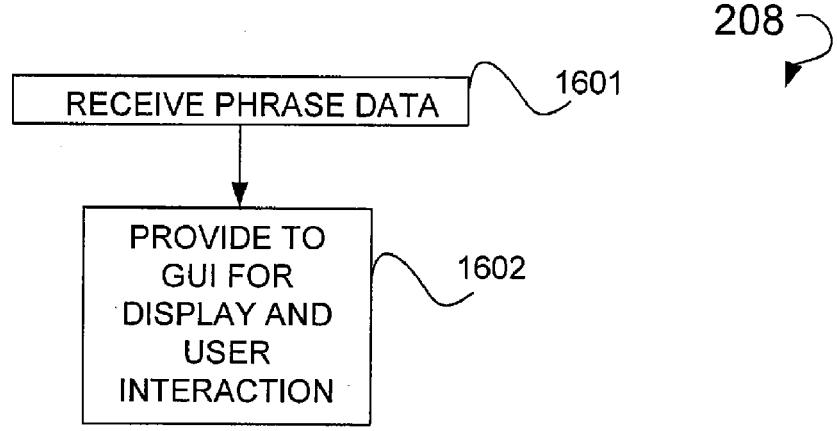
FIG. 16 is a flowchart illustrating a method used to implement or execute an operation that clusters the search results, according to an example embodiment.

FIG. 16 is a flowchart illustrating an example method used to implement or execute operation 208. Illustrated is an operation 1601 that receives phrase data. Next, an operation 1602 is executed that provides a Graphical User Interface (GUI) for display in user interaction. More to the point, through the execution of this operation 1602, the phrase data (e.g., search results) may be displayed to a user in response to a query, such as a query 108 tendered by the user (e.g., user 101) to the system, using search clustering for the purposes of obtaining a search result.

Evaluating the STC Algorithm and the Multi-Factor Clustering

In some embodiments, a mechanism is provided to measure and validate the clustering system. One measure that may be provided for evaluating the clustering system is to determine coverage and precision for the clustering system. For example, one goal of the clustering system is to cluster as many of the results into clusters as possible; coverage could be measured using the ratio of all those result items that belong to at least one cluster of size>1 to the total number of items in the result set. Further, in an extreme situation, one could define a single cluster with all the result documents in it to achieve coverage of 1.

Precision may be determined, in some embodiments, through approximations like cluster overlap or cluster independence. While the STC algorithm allows for overlapping clusters, its also may facilitate the creation of clusters that are fairly unique in their theme. We can say that the cluster independence measure is high when we can separate out clusters through their distinction from others. One way to achieve high cluster independence is by putting each item in a separate cluster, or by creating random buckets of clusters, each of which has independent sets of items. Since our algorithm is designed with the sincere goal of achieving clustering based upon commonality of terms and other factors, we can define a measure based upon how much clusters overlap.

For example, given clusters $\{C_1, C_2, \ldots, C_n\}$ where $|C_i|>1$ for all i, i=1 . . . n, we can say that we have good cluster separation if for any $C_i$, $C_j$ where i, j=1, . . . , n, if $C_i \cap C_j = \phi$. Since we have n clusters, each pair $C_i$, $C_j$ makes a contribution into the overall measure. The contribution made by the pair is proportional to the size of the way we define cluster separation measure $\mu_{ij}=1-|C_i \cap C_j|/|C_i \cup C_j|$. Since there are <n,2> combinations of pairs of the form $(C_i, C_j)$ we give each $\mu_{ij}$ a certain weight of contribution to the overall measure. This weight would be $w_{ij}=|C_i \cup C_j|/|\cup C_i|$. Thus, the overall cluster separation measure $\mu$ is given by $\Sigma \mu_{ij} w_{ij}$. JJ In some embodiments, cluster quality is an important measure. Cluster quality may be defined as follows. For each cluster, we have defined cluster tags. Cluster tags aggregated define the theme of that cluster. If the cluster tags are fairly independent of each other that indicate that the cluster quality is good. If clusters are to be fairly separate in nature, the tags defining the clusters should be fairly distinct. The overall cluster quality may be defined as $1-\Sigma(|Ti \cap Tj|/|Ti \cup Tj|)$, for all i,j. If there is no overlap in tags, then cluster quality is 1. If cluster themes overlap then the tags are shared.

Some embodiments may include cluster quality as defined in terms of the category distribution of the items in a cluster. In some cases, items in a cluster may be defined in a hierarchical category structure, such that every item belongs to a leaf level category in this hierarchy. The actual category is chosen by the seller of the item. The categories themselves, however, may be pre-defined. A seller may try his/her best to put an item in the right leaf category. However, items sometimes are wrongly listed either because the seller could not identify the right category or the seller deliberately incorrectly lists/mislabels an item. Ignoring this factor (e.g., incorrect lists/mislabels), if one were to look at the distribution of items within a cluster across categories, it will give one an understanding of how well the items are clustered. To do this, we would do the following. We would define the category entropy (CE) of cluster $C_i$ as $$CE_i = -\Sigma w_k \log w_k$$

where $w_k$ represents the weight of the category k, $w_k = d_k/N_i$, $d_k$ is the number of documents present in cluster $C_i$ that belong to category k and $N_i$ is the total number of documents in the cluster $C_i$. One could define CE across all the clusters as the weighted entropy of the individual cluster category entropies:

$$CE = (\Sigma N_i * CE_i)/\Sigma N_i$$

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend or storage tier. These logical/mathematical manipulations may relate to certain business rules or processes that govern the software application as a whole. A third, storage tier, may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Component Design

Some example embodiments may include the above-illustrated tiers, and their processes or operations, as being written as one or more software components. Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques and can be written in the same programming language or different programming languages. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transmission Control Protocol/Internet Protocol (TCP/IP) protocol stack model for defining the protocols used by a network to transmit data.

A System of Transmission Between a Server and Client

Some embodiments may utilize the Open Systems Interconnection (OSI) model, or the Transmission Control Protocol/Internet Protocol (TCP/IP) protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, LAN, WAN, or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology) or structures.

A Computer System

Figure 17:
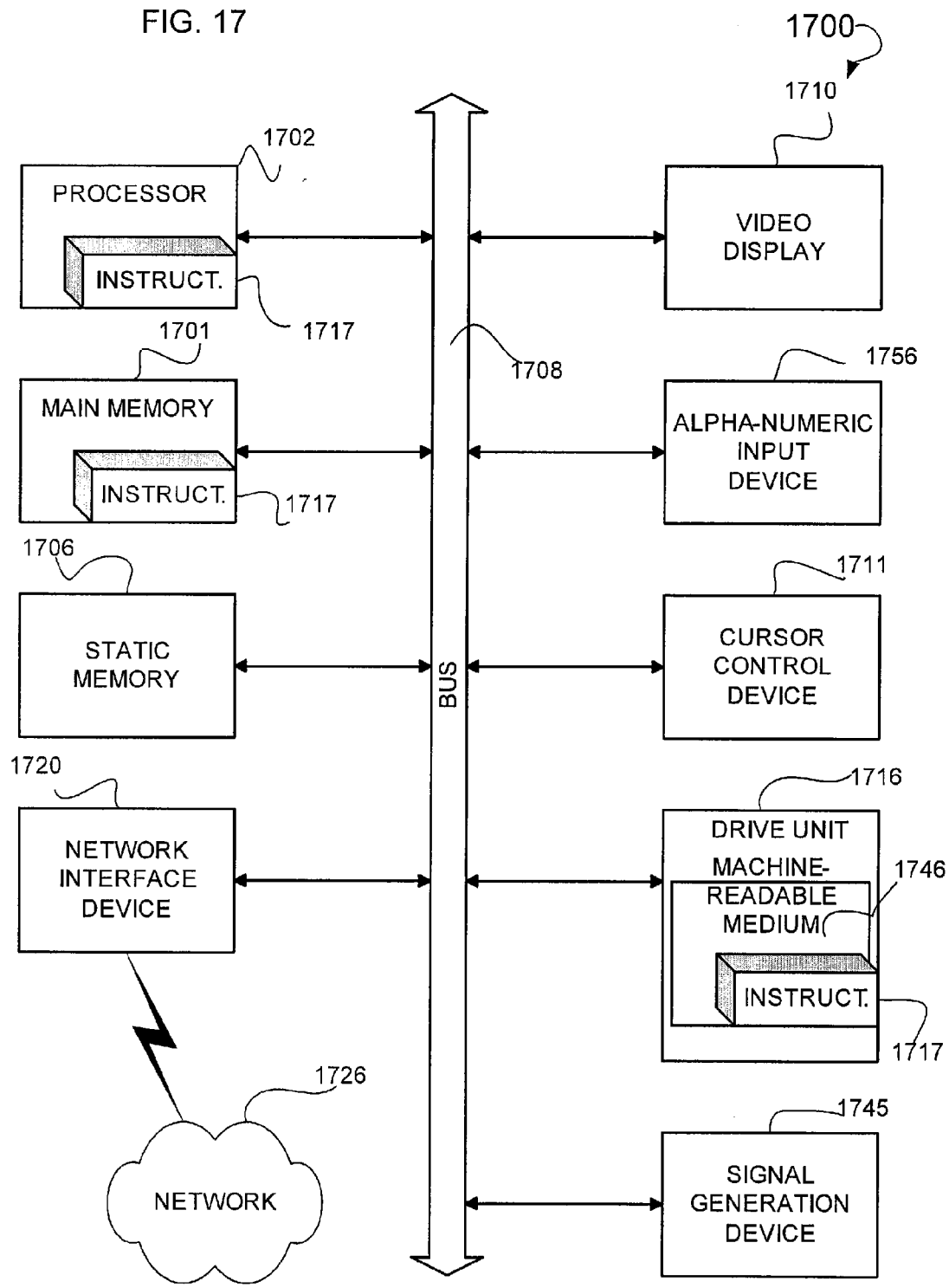
FIG. 17 shows a diagrammatic representation of a machine in the example form of a computer system within which a set of instructions for causing the machine to perform any one or more of the methodologies discussed herein may be executed, according to an example embodiment.

FIG. 17 shows a diagrammatic representation of a machine in the example form of a computer system 1700 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment or as a peer machine in a peer-to-peer (or distributed) network environment. The machine may be a Personal Computer (PC), a tablet PC, a Set-Top Box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Example embodiments can also be practiced in distributed system environments where local and remote computer systems which are linked (e.g., either by hardwired, wireless, or a combination of hardwired and wireless connections) through a network both perform tasks. In a distributed system environment, program modules may be located in both local and remote memory-storage devices (see below).

The example computer system 1700 includes a processor 1702 (e.g., a Central Processing Unit (CPU), a Graphics Processing Unit (GPU) or both), a main memory 1701 and a static memory 1706, which communicate with each other via a bus 1708. The computer system 1700 may further include a video display unit 1710 (e.g., a Liquid Crystal Display (LCD) or a Cathode Ray Tube (CRT)). The computer system 1700 also includes an alphanumeric input device 1756 (e.g., a keyboard), a User Interface (UI) cursor controller 1711 (e.g., a mouse), a disc drive unit 1716, a signal generation device 1745 (e.g., a speaker) and a network interface device (e.g., a transmitter) 1720.

The disc drive unit 1716 includes a machine-readable medium 1746 on which is stored one or more sets of instructions 1717 and data structures (e.g., software) embodying or utilized by any one or more of the methodologies or functions illustrated herein. The software may also reside, completely or at least partially, within the main memory 1701 and/or within the processor 1702 during execution thereof by the computer system 1700, the main memory 1701 and the processor 1702 also constituting machine-readable media.

The instructions 1717 may further be transmitted or received over a network 1726 via the network interface device 1720 utilizing any one of a number of well-known transfer protocols (e.g., HTTP, SIP).

The term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any of the one or more of the methodologies illustrated herein. The term "machine-readable medium" shall accordingly be taken to include, but not be limited to, solid-state memories, optical and magnetic medium, and carrier wave signals.

Marketplace Applications

A commercial website may have thousands, if not millions, of item descriptions (e.g., item data). These descriptions may include title information, advertisement information, and other information generated to illustrate and categorize an item for sale on a website. One challenge that the owners of the website may face is to develop a way to allow for all these descriptions and associated information to be effectively searched. While increased computing power may be one solution, another solution is to generate a more effective sorting, and search algorithm. When determining what is an effective sorting and search algorithm, one place to begin is with the data structure and the ability of that data structure to process a set of data. For the faster that the item data can be sorted and successfully searched, the faster search results are returned. The faster search results are returned, the more efficient and effective a website is viewed by users and customers.

In some embodiments, efficient data structures are leveraged to generate aggregations of searchable item data using a suffix ordering. Once these data structures are generated, then a user is free to conduct a string search looking for item data the matches their search query. Through using data structures having constant time (O(1)), or near constant time (e.g., amortized O(1)) performance) search performance in conjunction with methods used to reduce item data redundancies, a user may be provided with search results in a quick and efficient manner.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
   calculating a demand factor based on relationships of items and categories to query terms of search queries, the relationships established from user actions resulting from the search queries;
   calculating a relevance score using the demand factor, the relevance score calculated, in part, based on a comparison of a similarity of a demand category histogram and a supply category histogram;
   identifying noise data using the demand factor;
   retrieving, from a plurality of listings, item data filtered from the noise data;
   constructing, using a processor, at least one base cluster having at least one document with common item data stored in a suffix ordering;
   compacting the at least one base cluster to create a compacted cluster representation having a reduced duplicate suffix ordering amongst the clusters; and
   merging the compact cluster representation to generate a merged cluster, the merging based upon a first overlap value applied to the at least one document with common item data, the merged cluster being based at least in part on the demand factor.

2. The method of claim 1, wherein the item data includes at least one of an item title, an item category, or seller information.

3. The method of claim 1, wherein the item data is part of a plurality of merged clusters organized into a hierarchy of merged clusters.

4. The method of claim 1, further comprising filtering the item data from the noise data based upon a frequency with which a word is used in a search as compared to a frequency another word is used in the search.

5. The method of claim 1, wherein the suffix ordering is stored in a data structure that includes at least one of a trie, a hash table, a binary search tree, a red-black tree, or a heap.

6. The method of claim 1, further comprising merging the compact cluster representation based upon one or more of a relevance-weight factor, a seller factor, a price factor, a category factor, or an image factor.

7. The method of claim 1, further comprising labeling the at least one base cluster.

8. The method of claim 1, further comprising evaluating the merged cluster to determine a coverage value for the merged cluster, and a second overlap value relating to the at least one documents contained within the merged cluster.

9. The method of claim 8, further comprising merging the compacted cluster representation to generate a merged cluster based upon the coverage value and the second overlap value.

10. The method of claim 1, further comprising:
    receiving a search query, the search query relating to item data; and
    extracting the item data from the merged cluster as a search result, the search result extracted based upon a similarity between the search query and the item data.

11. The method of claim 1, further comprising removing the noise data identified based on the demand factor from the search queries.

12. A computer system comprising:
    at least one processor;
    a demand data engine to calculate a demand factor based on relationships of items and categories to query terms of search queries and further to identify noise data using the demand factor, the relationships established from user actions resulting from the search queries;
    a calculator to calculate a relevance score using the demand factor, the relevance score calculated, in part, based on a comparison of a similarity of a demand category histogram and a supply category histogram;
    a retrieving engine to retrieve, from a plurality of listings, item data filtered from the noise data;
    a cluster generator to construct, using the at least one processor, at least one base cluster having at least one document with common item data stored in a suffix ordering;
    a compacting engine to compact the at least one base cluster to create a compacted cluster representation having a reduced duplicate suffix ordering amongst the clusters; and
    a first merging engine to merge the compact cluster representation to generate a merged cluster, the merging based upon a first overlap value applied to the at least one document with common item data, the merged cluster being based at least in part on the demand factor.

13. The computer system of claim 12, wherein the item data includes at least one of an item title, an item category, or seller information.

14. The computer system of claim 12, wherein the item data is part of a plurality of merged clusters organized into a hierarchy of merged clusters.

15. The computer system of claim 12, further comprising a separating engine to filter the item data from the noise data based upon a frequency with which a word is used in a search as compared to a frequency another word is used in the search.

16. The computer system of claim 12, wherein the suffix ordering is stored in a data structure that includes at least one of a trie, a hash table, a binary search tree, a red-black tree, or a heap.

17. The computer system of claim 12, further comprising a second merging engine to merge the compact cluster representation based upon one or more of a relevance-weight factor, a seller factor, a price factor, a category factor, or an image factor.

18. The computer system of claim 12, further comprising a labeling engine to label the at least one base cluster.

19. The computer system of claim 12, further comprising an evaluation engine to evaluate the merged cluster to determine a coverage value for the merged cluster, and a second overlap value relating to the at least one documents contained within the merged cluster.

20. The computer system of claim 19, further comprising a third merging engine to merge the compacted cluster representation to generate a merged cluster based upon the coverage value and the second overlap value.

21. The computer system of claim 12, further comprising:
a receiver to receive a search query, the search query relating to item data; and
an extractor to extract the item data from the merged cluster as a search result, the search result extracted based upon a similarity between the search query and the item data.

22. An apparatus comprising:
at least one processor;
means for calculating a demand factor based on relationships of items and categories to query terms of search queries, the relationships established from user actions resulting from the search queries;
means for calculating a relevance score using the demand factor, the relevance score calculated, in part, based on a comparison of a similarity of a demand category histogram and a supply category histogram;
means for identifying noise data using the demand factor;
means for retrieving, from a plurality of listings, item data filtered from the noise data;
means for constructing, using the at least one processor, at least one base cluster having at least one document with common item data stored in a suffix ordering;
means for compacting the at least one base cluster to create a compacted cluster representation having a reduced duplicate suffix ordering amongst the clusters; and
means for merging the compact cluster representation to generate a merged cluster, the merging based upon a first overlap value applied to the at least one document with common item data, the merged cluster being based at least in part on a the demand factor.

23. A non-transitory machine-readable storage medium comprising instructions, which when implemented by one or more processors of a machine cause the machine to perform operations comprising:
calculating a demand factor based on relationships of items and categories to query terms of search queries, the relationships established from user actions resulting from the search queries;
calculating a relevance score using the demand factor, the relevance score calculated, in part, based on a comparison of a similarity of a demand category histogram and a supply category histogram;
identifying noise data using the demand factor;
retrieving, from a plurality of listings, item data filtered from the noise data;
constructing at least one base cluster having at least one document with common item data stored in a suffix ordering;
compacting the at least one base cluster to create a compacted cluster representation having a reduced duplicate suffix ordering amongst the clusters; and
merging the compact cluster representation to generate a merged cluster, the merging based upon a first overlap value applied to the at least one document with common item data, the merged cluster being based at least in part on the demand factor.

* * * * *

UNITED STATES PATENT AND TRADEMARK OFFICE
CERTIFICATE OF CORRECTION

PATENT NO. : 8,131,722 B2  Page 1 of 1
APPLICATION NO. : 11/771464
DATED : March 6, 2012
INVENTOR(S) : Neelakantan Sundaresan et al.

It is certified that error appears in the above-identified patent and that said Letters Patent is hereby corrected as shown below:

In column 10, line 17, delete "decending." and insert -- descending. --, therefor.

In column 12, line 30, delete "photo.s" and insert -- photos --, therefor.

In column 16, line 44, delete "$W_3$" and insert -- $w_3$ --, therefor.

In column 19, line 34, delete "Exapansion" and insert -- Expansion --, therefor.

In column 28, line 3, in Claim 22, after "on" delete "a".

Signed and Sealed this
Nineteenth Day of June, 2012

David J. Kappos
*Director of the United States Patent and Trademark Office*